US008333652B2

(12) United States Patent
Nguyen et al.

(10) Patent No.: US 8,333,652 B2
(45) **Date of Patent: *Dec. 18, 2012**

(54) INTELLIGENT CASINO GAMING TABLE AND SYSTEMS THEREOF

(75) Inventors: Binh Nguyen, Reno, NV (US); Kevin Gum, Sparks, NV (US); Chauncey Griswold, Reno, NV (US)

(73) Assignee: IGT, Reno, NV (US)

( * ) Notice: Subject to any disclaimer, the term of this patent is extended or adjusted under 35 U.S.C. 154(b) by 1594 days.

This patent is subject to a terminal disclaimer.

(21) Appl. No.: 11/515,184

(22) Filed: Sep. 1, 2006

(65) Prior Publication Data

US 2008/0076506 A1 Mar. 27, 2008

(51) Int. Cl.
*A63F 9/24* (2006.01)
*A63F 13/00* (2006.01)
*G06F 17/00* (2006.01)
*G06F 19/00* (2011.01)

(52) U.S. Cl. ................ 463/22; 463/29; 463/30; 463/36; 463/37; 463/40

(58) Field of Classification Search .................... 463/22, 463/31, 42

See application file for complete search history.

(56) References Cited

U.S. PATENT DOCUMENTS

| | | | | |
|---|---|---|---|---|
| 5,655,966 | A * | 8/1997 | Werdin et al. | 463/25 |
| 6,149,522 | A | 11/2000 | Alcorn et al. | |
| 6,264,561 | B1 | 7/2001 | Crowder et al. | |
| 6,313,871 | B1 | 11/2001 | Schubert | |
| 6,375,572 | B1 * | 4/2002 | Masuyama et al. | 463/43 |
| 6,620,047 | B1 | 9/2003 | Alcorn et al. | |
| 6,645,077 | B2 | 11/2003 | Rowe | |
| 6,651,985 | B2 | 11/2003 | Sines et al. | |

(Continued)

OTHER PUBLICATIONS

International Search Report and Written Opinion for PCT/US2007/077427, mailed on Mar. 19, 2008.

(Continued)

*Primary Examiner* — Michael Cuff
*Assistant Examiner* — Kevin Y Kim
(74) *Attorney, Agent, or Firm* — Weaver Austin Villeneuve & Sampson LLP

(57) ABSTRACT

A technique is disclosed for facilitating play of a casino table game at a casino gaming table system which includes a casino gaming table and at least one handheld device. At least a portion of operations or activities relating to the casino game may be performed at a first handheld device. Examples of such operations may include electronically dealing a first card to a first player via the first handheld device, displaying a representation of the first card to the first player via a display at the first handheld device, etc. In at least one embodiment, an association between a selected handheld device and the first player station may be created and used for subsequent game play activities to enable the selected handheld device to be operable to display game play data relating to game play activities associated with the first player station. In some embodiments, at least a portion of the features of a selected handheld device may be enabled/disabled based on the detection of one or more conditions or events. According to specific embodiments, the handheld device may be adapted to provide various functionality for facilitating game play at a casino gaming table. Examples of such functionality may include, for example, allowing a player to select cards for discard/holding; allowing a player to perform wagering activities; retrieving and/or displaying player tracking data; retrieving and/or displaying player account data; displaying game play assistance information; displaying casino layout information; displaying promotional information; etc.

29 Claims, 8 Drawing Sheets

U.S. PATENT DOCUMENTS

| | | | | |
|---|---|---|---|---|
| 6,652,378 | B2 * | 11/2003 | Cannon et al. | 463/20 |
| 6,685,567 | B2 | 2/2004 | Cockerille et al. | |
| 6,804,763 | B1 | 10/2004 | Stockdale et al. | |
| 6,863,608 | B1 | 3/2005 | LeMay et al. | |
| 6,922,276 | B2 | 7/2005 | Zhang et al. | |
| 7,111,141 | B2 | 9/2006 | Nelson | |
| 7,255,642 | B2 | 8/2007 | Sines et al. | |
| 7,384,339 | B2 | 6/2008 | LeMay et al. | |
| 7,515,718 | B2 | 4/2009 | Nguyen et al. | |
| 2001/0000118 | A1 * | 4/2001 | Sines et al. | 273/274 |
| 2002/0002072 | A1 | 1/2002 | Sines et al. | |
| 2003/0027632 | A1 | 2/2003 | Sines et al. | |
| 2003/0078103 | A1 | 4/2003 | LeMay et al. | |
| 2003/0148812 | A1 | 8/2003 | Paulsen et al. | |
| 2003/0203756 | A1 | 10/2003 | Jackson | |
| 2004/0002386 | A1 | 1/2004 | Wolfe | |
| 2004/0137987 | A1 | 7/2004 | Nguyen et al. | |
| 2004/0203895 | A1 | 10/2004 | Balasuriya | |
| 2004/0251630 | A1 | 12/2004 | Sines et al. | |
| 2005/0261816 | A1 | 11/2005 | DiCroce et al. | |
| 2006/0018942 | A1 | 1/2006 | Rowe et al. | |
| 2006/0036874 | A1 | 2/2006 | Cockerille et al. | |
| 2006/0058091 | A1 | 3/2006 | Crawford, III et al. | |
| 2006/0189365 | A1 | 8/2006 | Crawford et al. | |
| 2006/0189384 | A1 * | 8/2006 | Crawford et al. | 463/31 |
| 2006/0252530 | A1 | 11/2006 | Oberberger et al. | |
| 2007/0298873 | A1 | 12/2007 | Nguyen et al. | |
| 2008/0076505 | A1 | 3/2008 | Nguyen et al. | |
| 2009/0098925 | A1 * | 4/2009 | Gagner et al. | 463/20 |

OTHER PUBLICATIONS

International Search Report and Written Opinion for PCT/US2007/077428, mailed on Feb. 5, 2008.

ECMA International, "Near Field Communication Interface and Protocol—2 (NFCIP-2)," Standard ECMA—352, 1st Edition, 8 pages, 2003.

ECMA International, "Near Field Communication Interface and Protocol—2 (NFCIP-1)," Standard ECMA—340, 2nd Edition, 60 pages, 2004.

ECMA International, "Near Field Communication—White Paper" ECMA/TC32-TG19/2004/1, 9 pages, 2004.

PokerPro Promotional Material obtained from ATEI Exhibition Jan. 24-26, London, UK, 2006, 4 pages.

US Office Action dated Mar. 17, 2010 issued in U.S. Appl. No. 11/515,183.

US Final Office Action dated Aug. 19, 2010 issued in U.S. Appl. No. 11/515,183.

US Examiner Interview Summary dated Jan. 11, 2011 issued in U.S. Appl. No. 11/515,183.

Australian First Office Action dated Jun. 21, 2011 issued in Application Serial No. 2007289045.

Australian First Office Action dated Jul. 8, 2011 issued in Application Serial No. 2007292471.

* cited by examiner

INTELLIGENT CASINO GAMING TABLE AND SYSTEMS THEREOF

BACKGROUND OF THE INVENTION

This invention relates to casino gaming technology. More particularly, the present invention relates to improved techniques for implementing electronic playing cards in a variety of casino table gaming environments.

In the gaming industry there is a significant volume of gambling which occurs at table games which use playing cards. Exemplary table games include blackjack, poker, baccarat, and others. There are also a number of proprietary or specialty table card games which have developed. These and many other games all involve play using playing cards. The use of playing cards has a number of associated limitations and disadvantages which have long plagued the casino industry. Some of these are of general concern to all or most playing card games. Others are problems associated with the use of playing cards in particular games. Some of the principal concerns and problems are discussed below.

The use of playing cards at table games typically involves several operational requirements which are time-consuming. These operations are conveniently described as collecting, shuffling and dealing of the cards. In many card games there is also a step of cutting the deck after it has been shuffled. Because substantial amounts of time are consumed by collecting, shuffling, cutting and dealing playing cards, the casino industry has long felt the desire to reduce the time spent and increase play of table games.

Additionally, in the gaming industry there is also a very significant amount of time and effort devoted to security issues which relate to play of the casino games. Part of the security concerns stem from frequent attempts to cheat during play of the games. Attempts to cheat are made by players, dealers, or more significantly by dealers and players in collusion. This cheating seeks to affect the outcome of the game in a way which favors the dealer or players who are working together. The amount of cheating in card games is significant to the casino industry and constitutes a major security problem which has large associated losses. The costs of efforts to deter or prevent cheating are very large and made on a daily basis.

Another notable problem suffered by table games is the intimidation which many novice or less experienced players feel when playing such games. Surveys have indicated that many new or less experienced people who come to a casino are inclined to play slot machines and video card games. These people feel intimidation at a table game because such games require quick thinking and decision making while other people are watching and waiting. This intimidation factor reduces participation in table games. Thus, there is a need for improved table games which reduce the intimidation factor and enhance the ease with which a player adopts play of such games. There is also need for table games which provide satisfaction to those who play, such that repeat participation is improved.

In an effort to address at least some of the above-described problems, the casino industry has developed newer gaming tables which include multiple electronic displays for displaying graphical representations of playing cards dealt to the players at the gaming table. For example, US Patent Publication No. US2004/0251630 A1 (to Sines et al.), herein incorporated by reference in its entirety, describes an electronic casino gaming table which allows for gaming table play without the use of conventional physical playing cards. The electronic casino gaming table includes multiple player displays for displaying virtual playing cards which are electronically dealt to players at the electronic gaming table. Shuttling, cutting, dealing, and return of playing cards are accomplished using data processing functions within an electronic game processor at the electronic gaming table.

According to the teachings of Sines, the electronic casino gaming table allows casinos to speed play and reduce the risk of cheating while maintaining the attractive ambience of a table game. However, such electronic casino gaming tables also introduce other undesirable problems. For example, there are security and privacy issues regarding the display of a player's cards or hand on a gaming table display screen, especially display screens which may be viewed by other players or spectators. Additionally, at least some players may dislike the notion of not being able to physically hold the cards which are dealt to them. Further, the associated costs of manufacturing and repairing electronic casino gaming tables are much greater than those associated with conventional casino gaming tables. For example, a faulty display screen at an electronic casino gaming table made not only be costly to repair, but also results in a loss of player attendance at that gaming table until the necessary repairs have been made.

In light of the above, it will be appreciated that there exists an ongoing need for improving casino gaming table designs and implementations.

SUMMARY OF THE INVENTION

Various aspects of the present invention are directed to different methods, systems, and computer program products for facilitating play of a casino table game at a casino gaming table system which includes a casino gaming table and a first handheld device. In one implementation, the casino gaming table includes a dealer station and a first player station. At least a portion of operations relating to the casino game may be performed at the first handheld device. Examples of such operations may include electronically dealing a first card to a first player via the first handheld device, displaying a representation of the first card to the first player via a display at the first handheld device, etc. In at least one embodiment, an association between a selected handheld device and the first player station may be created and used for subsequent game play activities to enable the selected handheld device to be operable to display game play data relating to game play activities associated with the first player station. The association between the selected handheld device and the first player station may also result in the casino gaming table system being automatically and/or dynamically configured to prevent the selected handheld device from being able to display other player card information relating to cards which have been dealt to other players at the casino gaming table. In yet other embodiments, at least a portion of the features of a selected handheld device may be enabled/disabled based on the detection of one or more conditions or events. For example, in one implementation, transmission of game play data to a selected handheld device may be disabled in response to a determination that the handheld device is not within a predetermined distance from the casino gaming table or component thereof.

Other aspects of the present invention are directed to different methods, systems, and computer program products for facilitating play of a casino table game at a casino gaming table system which includes a casino gaming table and a first handheld device. In at least one implementation, the casino gaming table may include a dealer station, a first player station, and a first docking region associated with the first player station. A first active player of the casino table game being played at the casino gaming table may be detected at the first player station. Verification that the first handheld device within a predetermined distance of the first docking region may also be performed. Verification that the first handheld device has been authorized for conducting game play activities relating to the first player station may also be performed. One or more playing cards may be electronically dealt the first active player via the first handheld device, and a representation of the first card may be displayed to the first active player via the first handheld device. In one embodiment, a handheld device may be used by a player to convey or input game play instructions. The game play instructions may then be used to implement additional game play operations or activities at the casino gaming table. According to specific embodiments, if the presence of a handheld device is detected as being within a predetermined distance of the first docking region, and it is determined that the handheld device has not been authorized for conducting game play operations relating to the first player station, game play data relating to the first player station may be prevented from being transmitted to the handheld device.

Other aspects of the present invention are directed to a handheld device for facilitating play of a casino table game at a casino gaming table system. In at least one implementation, the casino gaming table system may include a casino gaming table which includes a dealer station and a first player station. In one embodiment, the handheld device may include at least one processor, at least one interface and memory. According to specific embodiments, the handheld device may be operable to perform a variety of operations such as, for example: reading player ID data, receiving instructions for enabling the first handheld device to implement operations relating to game play activities associated with a selected player station; receiving a card information from the casino gaming table which identifies a first playing card that has been dealt to player at the selected player station; displaying a graphical representation of the first playing card on a first display of the first handheld device; etc. In one implementation, the handheld device may be operable to verify whether it has been authorized for communicating with the casino gaming table for facilitating game play activities relating to a selected player and/or selected player station. Game play instructions may be transmitted from the handheld device to the casino gaming table in response to a determination that the handheld device has been authorized for the operations being performed. In one implementation, the handheld device may be further operable to receive configuration instructions from the casino gaming table for configuring the first handheld device to not be operable to display other player card information relating to cards which have been dealt to other players at the casino gaming table. According to specific embodiments, the handheld device may be adapted to provide various functionality for facilitating game play at a casino gaming table. Examples of such functionality may include, one or more of the following features: allowing a player to select cards for discard/holding; allowing a player to perform wagering activities (e.g., increasing bets, checking bets, performing side wagering/backbetting activities, etc.); retrieving and/or displaying player tracking data; retrieving and/or displaying player account data; displaying game play assistance information; displaying casino layout information; displaying promotional information; etc.

Additionally, according to various embodiments, the handheld device may include other functionality such as, for example; determining a current location of the handheld device within the casino; automatically selecting an appropriate mode of operation of the handheld device based in various events and/or conditions; update a current mode of operation of the handheld device to the selected appropriate mode of operation; modify accessibility of user-accessible features of the handheld device in response to the updating of the current mode of operation of the handheld device to the selected appropriate mode of operation; etc.

Other aspects of the present invention are directed to different embodiments of a casino gaming table which includes a gaming table controller and a plurality of player stations. According to at least one embodiment, one or more player stations may include, for example: a communication system operable to perform wireless data communication with at least one handheld device. In one embodiment, the wireless communication data may include data relating to game play activities conducted at the casino gaming table. The communication system may also be operable to transmit game play data to the handheld device, and to receive, via the handheld device, game play input data provided by a player or other user of the handheld device. Additionally, the communication system may be operable to perform data communication with the gaming table controller. According to different embodiments, the casino gaming table and/or player station(s) may also include one or more power interfaces which are operable to distribute power to the handheld device(s).

According to specific embodiments, the gaming table controller may include functionality such as, for example: distribute electronic game play data to wireless handheld devices operated by players at the casino gaming table; dealing electronic cards to participants at the casino gaming table; verifying cards which have been dealt to participants at the casino gaming table; keeping track of wagering activities associated with a game being played at the casino gaming table; keeping track of cards which have been dealt to participants at the casino gaming table; providing status information relating to game play activities conducted at the casino gaming table; communicating with other casino gaming network devices; controlling selected peripheral devices; determining outcome information associated with player or dealer game play outcomes; etc.

Additional objects, features and advantages of the various aspects of the present invention will become apparent from the following description of its preferred embodiments, which description should be taken in conjunction with the accompanying drawings.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not obscure the present invention.

This invention is directed generally to casino games, and in particular to a technique for enabling play of a casino table game such as poker or blackjack at a casino gaming table using electronic cards rather than conventional playing cards. According to different embodiments of the present invention, aspects of the present invention may be implemented in live casino gaming table environments (e.g., such as those involving live dealers and live players who are physically present at a physically existing casino gaming table) and/or virtual casino gaming table environments (e.g., such as those involving some combination of virtual dealers, virtual players, and/or virtual casino gaming tables).

Figure 1:
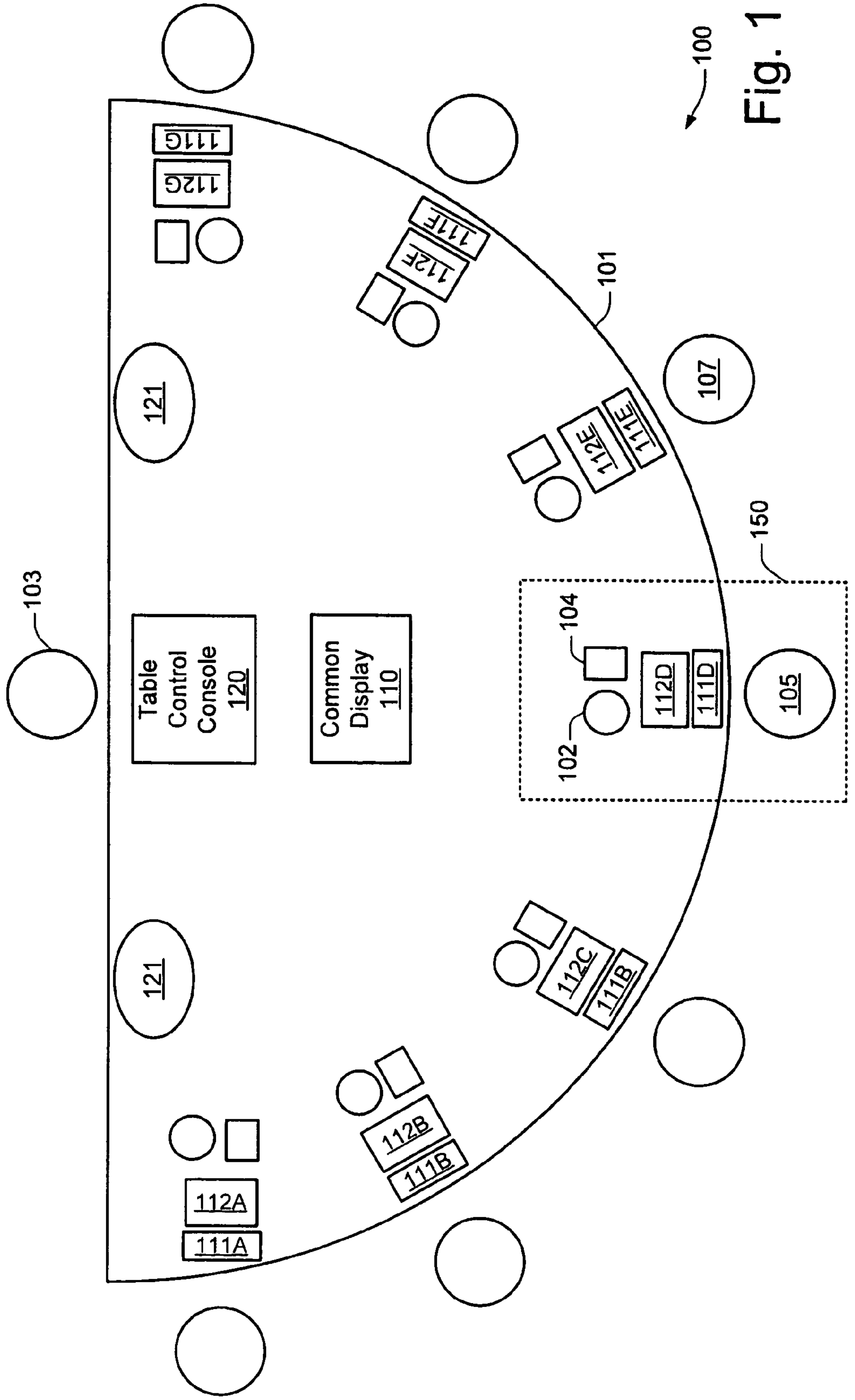
FIG. 1 shows an example of a specific embodiment of an intelligent gaming table which may be used for implementing various aspects of the present invention.

FIG. 1 shows an example of a specific embodiment of an intelligent gaming table which may be used for implementing various aspects of the present invention. As illustrated in the example of FIG. 1, a casino gaming table environment 100 is displayed which includes intelligent gaming table 101, dealer 103, and players (e.g., 105, 107). In this particular embodiment, the intelligent gaming table 101 includes a plurality of electronic displays (e.g., 112A-G, 110). In one embodiment, the plurality of electronic displays may be implemented as separate physical displays which have been mounted into (or onto) the body of a conventional-type casino gaming table. In an alternate embodiment, the entire top surface (or selected portions thereof) of the intelligent gaming table may be implemented as a continuous display, and the electronic displays (e.g., 112A-G, 110) implemented as specific display regions within the continuous display. Other embodiments of the intelligent gaming table of the present invention may resemble conventional-type casino gaming tables which do not include any electronic displays.

According to specific embodiments, the intelligent gaming table 101 can be of a variety of common constructions. For example, table 101 may include a table support trestle having legs which contact an underlying floor to support the intelligent gaming table thereon. The intelligent gaming table may have a table top and perimeter pad which extends fully about a semicircular portion of the table periphery. The straight, back portion of the periphery is used by the dealer 103 and can be partly or wholly padded as may vary with the particular table chosen.

A playing surface is provided upon the upwardly facing surface of table top upon which participants of the card game play. A plurality of players (e.g., 105) sit or stand along the semicircular portion and play a desired card game, such as the popular casino card game of blackjack. Other card games are alternatively possible, although the system described herein is specifically adapted for playing casino blackjack.

Although not shown in the example of FIG. 1, the intelligent gaming table 101 may also include a betting chip rack which allows the dealer to conveniently store betting chips used by the dealer in playing the game. A money drop slot may be further included to allow the dealer to easily deposit paper money bills thereinto when players purchase betting chips.

Table 101 can support a system, or form a part of a system for playing card games which is constructed according to specific embodiments of the present invention.

As illustrated in the example of FIG. 1, the intelligent gaming table may include a table control console 120 for use by the dealer and/or other casino employees. In one implementation, the table control console may be used to facilitate and execute game play operations, table configuration operations, player tracking operations, maintenance and inspection operations, etc.

Further, as illustrated in the example of FIG. 1, the intelligent gaming table may include a which is adapted to display images that depict the cards and card hands being played along with additional information used in the play of the card game. For example, as shown in the example of FIG. 1, the intelligent gaming table 101 includes a plurality of electronic displays (e.g., 112A-G, 110). In one embodiment, the plurality of electronic displays may be implemented as separate physical displays which have been mounted into (or onto) the body of a conventional-type casino gaming table. In an alternate embodiment, the entire top surface (or selected portions thereof) of the intelligent gaming table may be implemented as a continuous display, and the electronic displays (e.g., 112A-G, 110) implemented as specific display regions within the continuous display. Other embodiments of the intelligent gaming table of the present invention may resemble conventional-type casino gaming tables which do not include any electronic displays.

According to a specific embodiment, the presentation system or display units may be supported upon the upper or playing surface 55 of the intelligent gaming table. This allows the system to be easily installed upon a variety of differing intelligent gaming tables without extensive modifications being performed. Alternatively, the presentation system can otherwise be mounted upon the intelligent gaming table in a manner which allows participants to view one or more of the displays which form a part of the presentation system.

According to a specific embodiment, the presentation system may be adapted for use by a dealer 103 and multiple players (e.g. 105) who are in attendance and positioned about the intelligent gaming table.

As illustrated in the example of FIG. 1, the intelligent gaming table may optionally include one or more speakers 121 which, for example, may be used to provide various types of audio information such as, for example: game related information (e.g., instructions to players and/or dealer, sound effects, etc.), casino related announcements, gaming table status information, music, attracts, promotions, bonus information, communication information (e.g., for speakerphone or two-way radio communications), etc.

According to specific embodiments, the intelligent gaming table may include a plurality of electronic displays (e.g., 112A-G), herein termed player displays, which are capable of displaying changeable display images. The player display images are intended to display graphical representations of playing cards (e.g., virtual playing cards) and/or other information used in the play of the card game.

Additionally, as shown, for example, in FIG. 1, the intelligent gaming table may include one or more common displays (e.g., Common Display 110) which may present information for the exclusive use of the dealer and/or other information to be viewed by the dealer, players, spectators, and/or other persons. Various types of information which may be displayed at the common display 110 include, for example: dealer cards, ante information, common or shared player cards, individual player cards, wager information, etc. In one embodiment, the common display 110 may be used to:

- reveal cards of selected players (when appropriate);
- verify cards dealt to selected players;
- display the dealer's cards;
- display game play instructions;
- display table configuration information;
- display error messages;
- display wagering information;
- indicate which of the players is currently playing (e.g., show active player);
- display active players' actions (e.g., Hit, Hold, Double Down);
- display promotional information;
- identify players waiting for an opening at the table (e.g., next up);
- display community cards;
- display bonus game;
- display progressive jackpots;
- display multimedia information from external sources;
- etc.

Player displays 112 may be arranged adjacent to each player seating position. For example, player display 112D may be adapted for use by player 105, and player display 112E may be adapted for use by player 107.

In at least one embodiment, the intelligent gaming table displays may include touchscreen functionality for facilitating user interaction. For example, the player displays 112 may include a touchscreen and/or other input mechanisms for allowing the player to provide input relating to game play, preferences, wagering, player tracking activity, etc.

In at least one implementation, the intelligent gaming table may include one or more sensors (e.g., 111A-G) or other security mechanisms which, for example, may be used for a variety of purposes such as, for example, controlling the display of a player's cards; preventing accidental exposure of player cards; providing additional security features with respect to information displayed on the player's display; etc.

For example, in one embodiment, a pressure sensor may be provided to the control the display of a player's cards. In this particular embodiment, a player may be required to apply pressure on the pressure sensor in order to cause the player's cards to be display. In one of limitation, a velocity pressure sensor may be utilized to allow for more of the player's display information to be displayed in response to an increase in pressure on the pressure sensor, and to allow for less of the player's display information to be displayed in response to a decrease in the pressure on the pressure sensor.

In a different embodiment, a light sensor may be provided to the control the display of a player's cards. For example, in one implementation, the player's cards may be displayed in response to the light sensor detecting a predefined decrease in the amount of ambient light detected near the display such as, for example, in the situation where the player cups his or her hands over their player display.

In another embodiment, a heat sensor may be provided to the control the display of a player's cards. For example, in one implementation, the player's cards may be displayed in response to the heat sensor detecting a predefined increase in the amount of thermal heat detected near the display such as, for example, in the situation where the player cups his or her hands over their player display.

In another embodiment, a scrolling wheel or other mechanism may be provided to the control the display of a player's cards. For example, in one implementation, the player's cards may be gradually displayed in response to the player rotating the scrolling wheel in a first direction, and may be gradually hidden in response to the player rotating the scrolling wheel in a second (e.g., opposite) direction.

Other security mechanisms for controlling the display of information on a player's display may include, for example:

- biometric identification devices (e.g., fingerprint reader);
- use of player tracking cards and/or player tracking profile information;
- a "display cards" button;
- implementing a time delay before showing cards after receiving input to display cards;
- limiting viewing angle of player display so that only the player in front of the display can view the display;
- etc.

As illustrated in the example of FIG. 1, the intelligent gaming table 101 may include player betting zones (e.g., 102). In one embodiment, each player betting zone may include a betting chip detection component which may be adapted to automatically detect the presence and/or monetary amount of betting chips which have been placed within a player's betting zone. In at least one implementation, a player must position a betting chip within their respective betting zone to be considered a participant in the game being played.

One aspect of the present invention relates to a method and apparatus for graphically representing and displaying casino game play data (e.g., player cards, dealer cards, etc.) and/or other desired data on a mobile or handheld display device. For example, in at least one implementation, a respective handheld display device (herein referred to as virtual card or VCARD, e.g., 250 of FIG. 2) may be provided to each player at the intelligent gaming table for facilitating game play activities conducted at the intelligent gaming table or elsewhere. Associations may be made between VCARDs and players (and/or player positions at the intelligent gaming table) such that each VCARD is associated with a different player (and/or player position) at the intelligent gaming table. The intelligent gaming table may adapted to electronically "deal" cards to each of the players at the intelligent gaming table, and to store information relating to each player's hand on each player's corresponding VCARD. In at least one implementation, a player is able to view the cards of his or her hand on the display of that player's VCARD. As explained in greater detail below, a VCARD may also be adapted to perform other functions such as, for example:

- allowing a player to select cards for discard/holding;
- allowing a player to perform wagering activities (e.g., increasing bets, checking bets, performing side wagering/backbetting activities, etc.);
- retrieving and/or displaying player tracking data;
- retrieving and/or displaying player account data;
- displaying game play assistance information;
- displaying casino layout information;
- displaying promotional information;
- displaying multimedia information from external sources such as TV signals;
- etc.

According to a specific embodiment, the VCARD of the present invention may also be adapted to implement at least a portion of the features associated with other mobile devices such as those described, for example, in one or more of the following references, each of which being incorporated herein by reference in its entirety for all purposes: U.S. patent application Ser. No. 11/472,585 entitled "MOBILE DEVICE FOR PROVIDING FILTERED CASINO INFORMATION BASED ON REAL TIME DATA"; U.S. patent application Ser. No. 10/062,002 for "GAMING SYSTEM AND GAMING METHOD."

As illustrated in the example of FIG. 1, the intelligent gaming table 101 may include a plurality of VCARD docking regions (e.g., 104). In one implementation, a separate VCARD docking region is provided at each player station at the intelligent gaming table. According to various embodiments, a VCARD docking region may include appropriate hardware and/or software for implementing a variety of functions or features such as, for example:

- performing VCARD detection, authentication, and/or identification;
- providing wired or wireless communication with selected VCARDS;
- providing uni-directional or bi-directional communication with selected VCARDS;
- providing power and/or battery charging capabilities to selected VCARDS;
- reconfiguring VCARDS;
- updating VCARD software;
- downloading new games;
- reading player selections;
- etc.

In at least one embodiment, the VCARD docking regions may be part of a casino gaming network which, for example, may include one or more of: intelligent gaming table systems, electronic gaming machines, game servers, player tracking servers, casino accounting servers, and/or other component(s) with which communication may be desired. The VCARD docking regions may also be adapted to provide at least one communication interface for allowing selected VCARDs to communicate with desired components/systems of the casino gaming network.

In at least one embodiment, the VCARDs and/or VCARD docking regions may include one or more communication interfaces for facilitating communication with each other. Such communication interfaces may have a variety of architectures and utilize a variety of protocols such as, for example, USB, IEEE-1394 (FireWire™), Ethernet, etc. (e.g., in cases where the communication link is a wired link), or one or more wireless links utilizing one or more wireless protocols such as, for example: 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetic communication protocols, etc. The communication links may transmit electrical, electromagnetic or optical signals which carry digital data streams or analog signals representing various types of information.

In at least some embodiments, the VCARDs may be tethered wirelessly to the intelligent gaming table. In some other embodiments, the VCARDs may be tethered by a wire or cable. Such wire or cable may provide an electrical/data connection to components of the intelligent gaming table. In one such embodiment, the VCARD docking regions may be omitted from the intelligent gaming table.

It will be appreciated that, in other embodiments, various combinations of VCARDS and player displays may be used. For example, in some embodiments of the intelligent gaming tables of the present invention, all playing card related activity may be implemented using VCARDs. In at least some of these embodiments, the player displays (e.g., 112A-G) may be used to display desired information to the player (e.g., other than the player's cards) such as, wagering information, game rules, side wagering activities/information, other game play activities/information (e.g., keno, sports book wagering, etc.), etc. In other embodiments of the intelligent gaming table, the player displays (e.g., 112A-G) may be omitted.

In at least one implementation, a dealer at a intelligent gaming table may have access to multiple VCARDs which have not been yet been activated for play. When a new player desires to participate in the game being played at the intelligent gaming table, the dealer may select a VCARD for activation, activate the VCARD for game play, and hand the activated VCARD over to the new player.

A variety of different security-related features may be implemented at the intelligent gaming table in order, for example, to address various issues such as player cheating, VCARD tampering, unwanted or accidental viewing of player's cards, unauthorized use of player tracking or account data, etc.

For example, in at least one implementation, a VCARD must first be activated and/or undergo a registration process before being allowed to be used for game play at the intelligent gaming table. An example of a VCARD activation procedure is described in greater detail with respect to FIG. 6 of the drawings.

In one embodiment, a player may possess his or her own VCARD which has been registered for that player's exclusive use. For example, the VCARD may be registered and linked to the player's player tracking account. In at least one implementation, the player may carry his VCARD with him and use his VCARD for game play at any authorized intelligent gaming table. In one implementation, before a player-owned VCARD is enabled for use at the intelligent gaming table, a security check may be performed to authenticate and/or validate the VCARD before authorizing it for use at the intelligent gaming table, in order to help ensure that the VCARD has not been modified or tampered.

According to different embodiments, a VCARD may also be linked to a specific VCARD docking region (e.g., 104) which is associated with a specific player station (e.g., 150) at the intelligent gaming table. For example, in one implementation, before game play begins, a player at player station 150 may be required to place his or her VCARD within that station's VCARD docking region 104. Once the game play begins, a pairing mechanism may be established between the player's VCARD and VCARD docking region 104. In one implementation, such pairing mechanism may result in the VCARD being unable to communicate with any other VCARD docking region at the intelligent gaming table during the game play (e.g., until the current round of game play has ended), and may also result in the VCARD docking region 104 being unable to communicate with any other VCARD during the game play. Such pairing mechanisms may help prevent other players (and/or persons near the intelligent gaming table) from being able to gain access to unauthorized game play data (such as, for example, cards dealt to other players at the intelligent gaming table).

Another security measure which may be implemented relates to a VCARD function control mechanism which may be adapted to prevent a VCARD from performing certain functions and/or from displaying selected information based on the occurrence of various conditions. For example, in one implementation, the VCARD may be adapted to allow for the display of the player's cards only when the VCARD is within an allowable "VCARD display zone" such as, for example, a predetermined distance (e.g., within 5 feet) from the intelligent gaming table and/or associated VCARD docking region.

If the VCARD is moved to a location outside of the allowable display zone, the VCARD display may be cleared and/or disabled. According to a specific embodiment, one mechanism for implementing such a security feature is via the use of near-field magnetic communication technology. For example, in one implementation, at least one communication channel between a VCARD and its associated VCARD docking station may be implemented using a near-field communication protocol which has been adapted to allow a bi-directional communication between the VCARD and the VCARD docking station within a range of up to 5 feet. The VCARD may be adapted to require that this communication channel remain active in order to display the play the player's cards (and/or to display or perform other specified functions). When the VCARD is moved to a location more than 5 feet from the VCARD docking station, the near-field communication channel will go down, and in response, the VCARD may be adapted to clear and/or disable its display. When the VCARD is moved to a location within 5 feet from the VCARD docking station, the near-field communication channel may be re-established, and in response, the VCARD may be adapted to refresh and/or enable it's display. An example of a near-field communication protocol is the ECMA-340 "Near Field Communication—Interface and Protocol (NFCIP-1)", published by ECMA International (www.ecma-international.org), herein incorporated by reference in its entirety for all purposes. It will be appreciated that other types of Near Field Communication protocols may be used including, for example, near field magnetic communication protocols, near field RF communication protocols, and/or other wireless protocols which provide the ability to control with relative precision (e.g., on the order of centimeters, inches, feet, meters, etc.) the allowable radius of communication between at least 2 devices using such wireless communication protocols.

It will be appreciated that intelligent gaming table 101 is but one example from a wide range of intelligent gaming table designs on which the present invention may be implemented. For example, not all suitable intelligent gaming tables have electronic displays or player tracking features. Further, some intelligent gaming tables may include a single display, while others may include multiple displays. Other intelligent gaming tables may not include any displays. As another example, a game may be generated on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from gaming environments may be displayed on portable gaming devices that are used to facilitate game play activities at the intelligent gaming table. Further an intelligent gaming table or server may include gaming logic for commanding a remote gaming device to render an image from a virtual camera in 2-D or 3-D gaming environments stored on the remote gaming device and to display the rendered image on a display located on the remote gaming device. Thus, those of skill in the art will understand that the present invention, as described below, can be deployed on most any intelligent gaming table now available or hereafter developed.

Some preferred intelligent gaming tables of the present assignee are implemented with special features and/or additional circuitry that differentiates them from general-purpose computers (e.g., desktop PC's and laptops). Intelligent gaming tables are highly regulated to ensure fairness and, in some cases, intelligent gaming tables may be operable to dispense monetary awards. Therefore, to satisfy security and regulatory requirements in a gaming environment, hardware and software architectures may be implemented in intelligent gaming tables that differ significantly from those of general-purpose computers. A description of intelligent gaming tables relative to general-purpose computing machines and some examples of the additional (or different) components and features found in intelligent gaming tables are described below.

At first glance, one might think that adapting PC technologies to the gaming industry would be a simple proposition because both PCs and intelligent gaming tables employ microprocessors that control a variety of devices. However, because of such reasons as 1) the regulatory requirements that are placed upon intelligent gaming tables, 2) the harsh environment in which intelligent gaming tables operate, 3) security requirements and 4) fault tolerance requirements, adapting PC technologies to an intelligent gaming table can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in an intelligent gaming table because in an intelligent gaming table these faults can lead to a direct loss of funds from the intelligent gaming table, such as stolen cash or loss of revenue when the intelligent gaming table is not operating properly.

For the purposes of illustration, a few differences between PC systems and gaming systems will be described. A first difference between intelligent gaming tables and common PC based computers systems is that some intelligent gaming tables may be designed to be state-based systems. In a state-based system, the system stores and maintains its current state in a non-volatile memory, such that, in the event of a power failure or other malfunction the intelligent gaming table will return to its current state when the power is restored. For instance, if a player was shown an award for a table game and, before the award could be provided to the player the power failed, the intelligent gaming table, upon the restoration of power, would return to the state where the award is indicated. As anyone who has used a PC, knows, PCs are not state machines and a majority of data is usually lost when a malfunction occurs. This requirement affects the software and hardware design on an intelligent gaming table.

A second important difference between intelligent gaming tables and common PC based computer systems is that for regulation purposes, various software which the intelligent gaming table uses to generate table game play activities (such as, for example, the electronic shuffling and dealing of cards) may be designed to be static and monolithic to prevent cheating by the operator of intelligent gaming table. For instance, one solution that has been employed in the gaming industry to prevent cheating and satisfy regulatory requirements has been to manufacture an intelligent gaming table that can use a proprietary processor running instructions to generate the game play activities from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game play activities, such as adding a new device driver used by the master table controller to operate a device during generation of the game play activities can require a new EPROM to be burnt, approved by the gaming jurisdiction and reinstalled on the intelligent gaming table in the presence of a gaming regulator. Regardless of whether the EPROM solution is used, to gain approval in most gaming jurisdictions, an intelligent gaming table must demonstrate sufficient safeguards that prevent an operator or player of an intelligent gaming table from manipulating hardware and software in a manner that gives them an unfair and some cases an illegal advantage. The intelligent gaming table should have a means to determine if the code it will execute is valid. If the code is not valid, the intelligent gaming table must have a means to prevent the code from being executed. The code validation requirements in the gaming industry affect both hardware and software designs on intelligent gaming tables.

A third important difference between intelligent gaming tables and common PC based computer systems is the number and kinds of peripheral devices used on an intelligent gaming table are not as great as on PC based computer systems. Traditionally, in the gaming industry, intelligent gaming tables have been relatively simple in the sense that the number of peripheral devices and the number of functions the intelligent gaming table has been limited. Further, in operation, the functionality of intelligent gaming tables were relatively constant once the intelligent gaming table was deployed, i.e., new peripherals devices and new gaming software were infrequently added to the intelligent gaming table. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on an intelligent gaming table, intelligent gaming tables still have unique device requirements that differ from a PC, such as device security requirements not usually addressed by PCs. For instance, monetary devices, such as coin dispensers, bill validators and ticket printers and computing devices that are used to govern the input and output of cash to an intelligent gaming table have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in intelligent gaming tables that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

For example, a watchdog timer may be used in International Game Technology (IGT) intelligent gaming tables to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Intelligent gaming tables of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

One method of operation for IGT intelligent gaming table software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the intelligent gaming table.

In general, the intelligent gaming table does not advance from a first state to a second state until critical information that allows the first state to be reconstructed is stored. This feature allows the game to recover operation to the current state of play in the event of a malfunction, loss of power, etc that occurred just prior to the malfunction. After the state of the intelligent gaming table is restored during the play of a table game, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during the play of a table game, the intelligent gaming table may be restored to a state in the table game just prior to when the malfunction occurred. The restored state may include metering information and graphical information that was displayed on the intelligent gaming table in the state prior to the malfunction. For example, when the malfunction occurs during the play of a card game after the cards have been dealt, the intelligent gaming table may be restored with the cards that were previously displayed as part of the card game. As another example, a bonus game may be triggered during the play of a table game where a player is required to make a number of selections on a video display screen. When a malfunction has occurred after the player has made one or more selections, the intelligent gaming table may be restored to a state that shows the graphical presentation at the just prior to the malfunction including an indication of selections that have already been made by the player. In general, the intelligent gaming table may be restored to any state in a plurality of states that may occur while the table game is played, or to states that occur between the play of table games at the intelligent gaming table.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the intelligent gaming table and the state of the intelligent gaming table (e.g., credits) at the time the table game was played. The game history information may be utilized in the event of a dispute. For example, a player may decide that in a previous table game that they did not receive credit for an award that they believed they won. The game history information may be used to reconstruct the state of the intelligent gaming table prior, during and/or after the disputed game to demonstrate whether the player was correct or not in their assertion. Further details of a state based gaming system, recovery from malfunctions and game history are described in U.S. Pat. No. 6,804,763, titled "High Performance Battery Backed RAM Interface", U.S. Pat. No. 6,863,608, titled "Frame Capture of Actual Game Play," U.S. application Ser. No. 10/243,104, titled, "Dynamic NV-RAM," and U.S. application Ser. No. 10/758,828, titled, "Frame Capture of Actual Game Play," each of which is incorporated by reference and for all purposes.

Another feature of intelligent gaming tables, such as IGT gaming computers, is that they often include unique interfaces, including serial interfaces, to connect to specific subsystems internal and external to the intelligent gaming table. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the intelligent gaming table, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from an intelligent gaming table to a remote device. Often SAS is used in conjunction with a player tracking system.

IGT intelligent gaming tables may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT intelligent gaming table by monitoring security switches attached to access doors in the intelligent gaming table cabinet. Preferably, access violations result in suspension of game play and can trigger additional security operations to preserve the current state of game play. These circuits also function when power is off by use of a battery backup. In power-off operation, these circuits continue to monitor the access doors of the intelligent gaming table. When power is restored, the intelligent gaming table can determine whether any security violations occurred while power was off, e.g., via software for reading status registers. This can trigger event log entries and further data authentication operations by the intelligent gaming table software.

Trusted memory devices and/or trusted memory sources are preferably included in an IGT intelligent gaming table computer to ensure the authenticity of the software that may be stored on less secure memory subsystems, such as mass storage devices. Trusted memory devices and controlling circuitry are typically designed to not allow modification of the code and data stored in the memory device while the memory device is installed in the intelligent gaming table. The code and data stored in these devices may include authentication algorithms, random number generators, authentication keys, operating system kernels, etc. The purpose of these trusted memory devices is to provide gaming regulatory authorities a root trusted authority within the computing environment of the intelligent gaming table that can be tracked and verified as original. This may be accomplished via removal of the trusted memory device from the intelligent gaming table computer and verification of the secure memory device contents is a separate third party verification device. Once the trusted memory device is verified as authentic, and based on the approval of the verification algorithms included in the trusted device, the intelligent gaming table is allowed to verify the authenticity of additional code and data that may be located in the gaming computer assembly, such as code and data stored on hard disk drives. A few details related to trusted memory devices that may be used in the present invention are described in U.S. Pat. No. 6,685,567, filed Aug. 8, 2001 and titled "Process Verification," and U.S. patent application Ser. No. 11/221,314, filed Sep. 6, 2005, each of which is incorporated herein by reference in its entirety and for all purposes.

In at least one embodiment, at least a portion of the trusted memory devices/sources may correspond to memory which cannot easily be altered (e.g., "unalterable memory") such as, for example, EPROMS, PROMS, Bios, Extended Bios, and/or other memory sources which are able to be configured, verified, and/or authenticated (e.g., for authenticity) in a secure and controlled manner.

According to a specific implementation, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment of the present invention, the remote device and the trusted information source may engage in methods using zero knowledge proofs to authenticate each of their respective identities. Details of zero knowledge proofs that may be used with the present invention are described in US publication no. 2003/0203756, by Jackson, filed on Apr. 25, 2002 and entitled, "Authentication in a Secure Computerized Gaming System", which is incorporated herein in its entirety and for all purposes.

Gaming devices storing trusted information may utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Additional details relating to trusted memory devices/sources are described in U.S. patent application Ser. No. 11/078,966, entitled "SECURED VIRTUAL NETWORK IN A GAMING ENVIRONMENT", naming Nguyen et al. as inventors, filed on Mar. 10, 2005, herein incorporated in its entirety and for all purposes.

Mass storage devices used in a general purpose computer typically allow code and data to be read from and written to the mass storage device. In an intelligent gaming table environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present. Details using a mass storage device that may be used with the present invention are described, for example, in U.S. Pat. No. 6,149,522, herein incorporated by reference in its entirety for all purposes.

Figure 2:
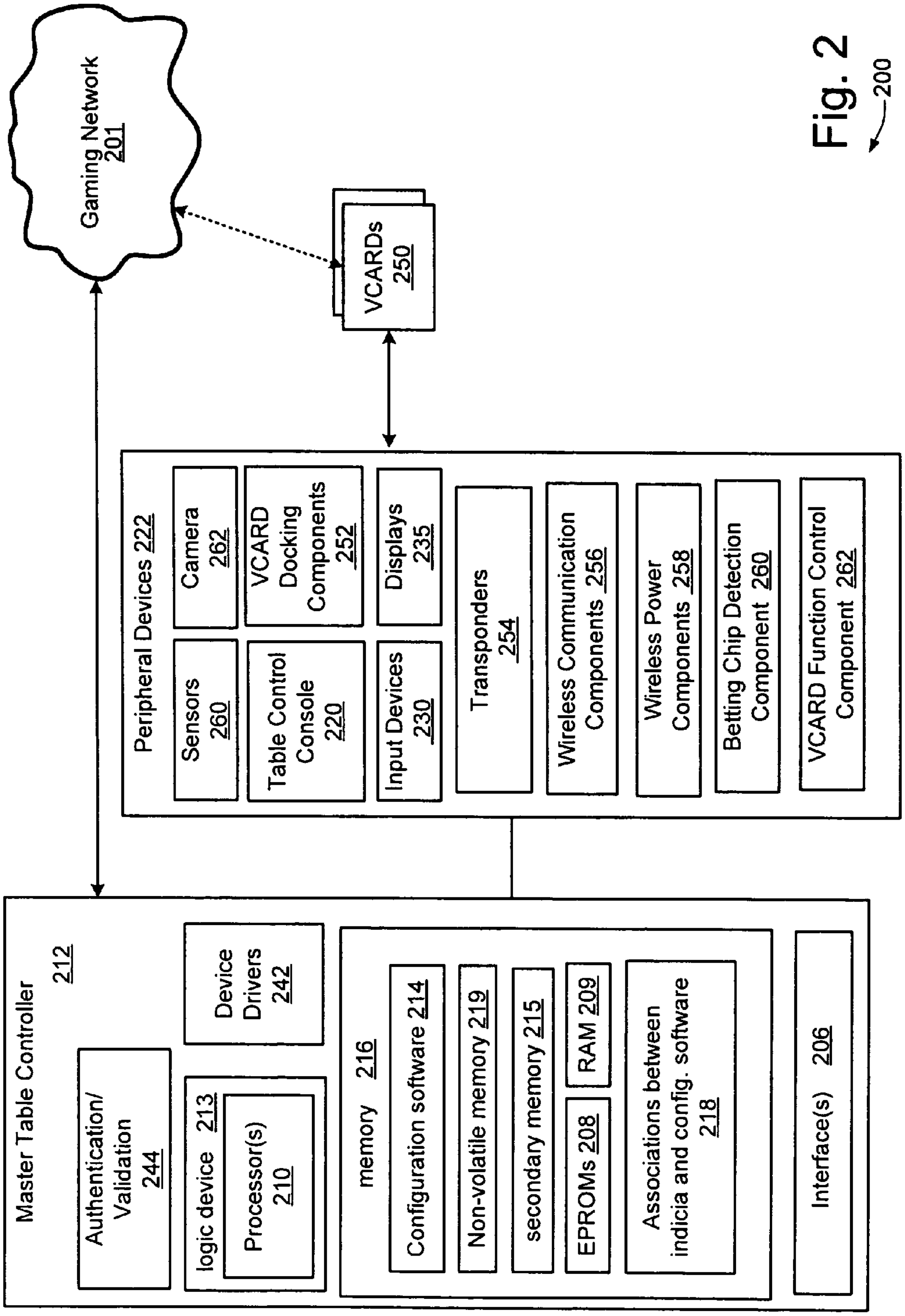
FIG. 2 is a simplified block diagram of an exemplary intelligent gaming table 200 in accordance with a specific embodiment of the present invention.

FIG. 2 is a simplified block diagram of an exemplary intelligent gaming table 200 in accordance with a specific embodiment of the present invention. As illustrated in the embodiment of FIG. 2, intelligent gaming table 200 includes at least one processor 210, at least one interface 206, and memory 216.

In one implementation, processor 210 and master table controller 212 are included in a logic device 213 enclosed in a logic device housing. The processor 210 may include any conventional processor or logic device configured to execute software allowing various configuration and reconfiguration tasks such as, for example: a) communicating with a remote source via communication interface 206, such as a server that stores authentication information or games; b) converting signals read by an interface to a format corresponding to that used by software or memory in the intelligent gaming table; c) accessing memory to configure or reconfigure game parameters in the memory according to indicia read from the device; d) communicating with interfaces, various peripheral devices 222 and/or I/O devices; e) operating peripheral devices 222 such as, for example, card readers, paper ticket readers, etc.; f) operating various I/O devices such as, for example, displays 235, input devices 230; etc. For instance, the processor 210 may send messages including game play information to the displays 235 to inform players of cards dealt, wagering information, and/or other desired information.

Peripheral devices 222 may include several device interfaces such as, for example: transponders 254, wire/wireless power supply devices, VCARD docking components, player tracking devices, card readers, bill validator/paper ticket readers, etc. Such devices may each comprise resources for handling and processing configuration indicia such as a microcontroller that converts voltage levels for one or more scanning devices to signals provided to processor 210. In one embodiment, application software for interfacing with peripheral devices 222 may store instructions (such as, for example, how to read indicia from a portable device) in a memory device such as, for example, non-volatile memory, hard drive or a flash memory.

In at least one implementation, the intelligent gaming table may include card readers such as used with credit cards, or other identification code reading devices to allow or require player identification in connection with play of the card game and associated recording of game action. Such a user identification interface can be implemented in the form of a variety of magnetic card readers commercially available for reading a user-specific identification information. The user-specific information can be provided on specially constructed magnetic cards issued by a casino, or magnetically coded credit cards or debit cards frequently used with national credit organizations such as VISA, MASTERCARD, AMERICAN EXPRESS, or banks and other institutions.

The intelligent gaming table may include other types of participant identification mechanisms which may use a fingerprint image, eye blood vessel image reader, or other suitable biological information to confirm identity of the user. Still further it is possible to provide such participant identification information by having the dealer manually code in the information in response to the player indicating his or her code name or real name. Such additional identification could also be used to confirm credit use of a smart card, transponder, and/or player's VCARD.

The intelligent gaming table 200 also includes memory 216 which may include, for example, volatile memory (e.g., RAM 209), non-volatile memory 219 (e.g., disk memory, FLASH memory, EPROMs, etc.), unalterable memory (e.g., EPROMs 208), etc. The memory may be configured or designed to store, for example: 1) configuration software 214 such as all the parameters and settings for a game playable on the intelligent gaming table; 2) associations 218 between configuration indicia read from a device with one or more parameters and settings; 3) communication protocols allowing the processor 210 to communicate with peripheral devices 222 and I/O devices 211; 4) a secondary memory storage device 215 such as a non-volatile memory device, configured to store gaming software related information (the gaming software related information and memory may be used to store various audio files and games not currently being used and invoked in a configuration or reconfiguration); 5) communication transport protocols (such as, for example, TCP/IP, USB, Firewire, IEEE1394, Bluetooth, IEEE 802.11x (IEEE 802.11 standards), hiperlan/2, HomeRF, etc.) for allowing the intelligent gaming table to communicate with local and non-local devices using such protocols; etc. In one implementation, the master table controller 212 communicates using a serial communication protocol. A few examples of serial communication protocols that may be used to communicate with the master table controller include but are not limited to USB, RS-232 and Netplex (a proprietary protocol developed by IGT, Reno, Nev.).

A plurality of device drivers 242 may be stored in memory 216. Example of different types of device drivers may include device drivers for intelligent gaming table components, device drivers for peripheral components 222, etc. Typically, the device drivers 242 utilize a communication protocol of some type that enables communication with a particular physical device. The device driver abstracts the hardware implementation of a device. For example, a device drive may be written for each type of card reader that may be potentially connected to the intelligent gaming table. Examples of communication protocols used to implement the device drivers include Netplex, USB, Serial, Ethernet 275, Firewire, I/O debouncer, direct memory map, serial, PCI, parallel, RF, Bluetooth™, near-field communications (e.g., using near-field magnetics), 802.11 (WiFi), etc. Netplex is a proprietary IGT standard while the others are open standards. According to a specific embodiment, when one type of a particular device is exchanged for another type of the particular device, a new device driver may be loaded from the memory 216 by the processor 210 to allow communication with the device.

For instance, one type of card reader in intelligent gaming table 200 may be replaced with a second type of card reader where device drivers for both card readers are stored in the memory 216.

In some embodiments, the software units stored in the memory 216 may be upgraded as needed. For instance, when the memory 216 is a hard drive, new games, game options, various new parameters, new settings for existing parameters, new settings for new parameters, device drivers, and new communication protocols may be uploaded to the memory from the master table controller 212 or from some other external device. As another example, when the memory 216 includes a CD/DVD drive including a CD/DVD designed or configured to store game options, parameters, and settings, the software stored in the memory may be upgraded by replacing a first CD/DVD with a second CD/DVD. In yet another example, when the memory 216 uses one or more flash memory 219 or EPROM 208 units designed or configured to store games, game options, parameters, settings, the software stored in the flash and/or EPROM memory units may be upgraded by replacing one or more memory units with new memory units which include the upgraded software. In another embodiment, one or more of the memory devices, such as the hard-drive, may be employed in a game software download process from a remote software server.

In some embodiments, the intelligent gaming table 200 may also include various authentication and/or validation components 244 which may be used for authenticating/validating specified intelligent gaming table components such as, for example, hardware components, software components, firmware components, information stored in the intelligent gaming table memory 216, etc. Examples of various authentication and/or validation components are described in U.S. Pat. No. 6,620,047, entitled, "ELECTRONIC GAMING APPARATUS HAVING AUTHENTICATION DATA SETS," incorporated herein by reference in its entirety for all purposes.

Peripheral devices 222 may also include other devices/components such as, for example: sensors 260, cameras 262, control consoles 220, transponders 254, wireless communication components 256, wireless power components 258, VCARD docking components 252, betting chip detection components 260, VCARD function control components 262, etc.

Sensors 260 may include, for example, optical sensors, pressure sensors, RF sensors, Infrared sensors, image sensors, thermal sensors, biometric sensors, etc. As mentioned previously, such sensors may be used for a variety of functions such as, for example: detecting the presence and/or monetary amount of betting chips which have been placed within a player's betting zone; detecting the presence and/or identity of VCARDs placed within a player's VCARD docking region, etc.

In one implementation, at least a portion of the sensors 260 and/or input devices 230 may be implemented in the form of touch keys selected from a wide variety of commercially available touch keys used to provide electrical control signals. Alternatively, some of the touch keys may be implemented in another form which are touch sensors such as those provided by a touchscreen display. For example, in at least one implementation, the intelligent gaming table player displays and/or VCARD displays may include input functionality for allowing players to provide their game play decisions/instructions (and/or other input) to the dealer using the touch keys and/or other player control sensors/buttons. Additionally, such input functionality may also be used for allowing players to provide input to other devices in the casino gaming network (such as, for example, player tracking systems, side wagering systems, etc.)

Wireless communication components 256 may include one or more communication interfaces having different architectures and utilizing a variety of protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetic communication protocols, etc. The communication links may transmit electrical, electromagnetic or optical signals which carry digital data streams or analog signals representing various types of information.

Wireless power components 258 may include, for example, components or devices which are operable for providing wireless power to other devices. For example, in one implementation, the wireless power components 258 may include a magnetic induction system which is adapted to provide wireless power to one or more VCARDs at the intelligent gaming table. In one implementation, a VCARD docking region may include a wireless power component which is able to recharge a VCARD placed within the VCARD docking region without requiring metal-to-metal contact.

According to a specific embodiment, Table Control Console 220 may be used to facilitate and execute game play operations, table configuration operations, player tracking operations, maintenance and inspection operations, etc. In one implementation, the Table Control Console 220 may include at least one display for displaying desired information, such as, for example, programming options which are available in setting up the system and customizing operational parameters to the desired settings for a particular casino or cardroom in which the system is being used. The Table Control Console 220 may also include a key operated switch which is used to control basic operation of the system and for placing the unit into a programming mode. The key operated switch can provide two levels of access authorization which restricts access by dealers to programming, or additional security requirements can be provided in the software which restricts programming changes to management personnel. Programming may be input in several different modes.

For example, in a specific embodiment where the intelligent gaming table is configured as a blackjack gaming table, programming can be provided using a touch screen display with varying options presented thereon and the programming personnel can set various operational and rules parameters, such as, for example: the shuffle mode, number of decks of cards used in the virtual card stack, options with regard to the portion of the stack which is used before the stack is cut, limits on the amounts which can be bet at a particular table, whether splits are accepted for play and to what degree, options concerning doubling down plays, whether the dealer hits or stands on soft 17, and other rules can be made variable dependent upon the particular form of the system programming used in the system, depending on the type of card game being played. Control keys may also be used in some forms of the invention to allow various menu options to be displayed and programming options to be selected using the control keys. Still further it is possible to attach an auxiliary keyboard (not shown) to the Table Control Console through a keyboard connection port. The auxiliary keyboard can then be used to more easily program the system, or be used in maintenance, diagnostic functions, etc.

According to specific embodiments, the Table Control Console 220 may also include a plurality of dealer operational controls provided in the form of dealer control sensors which, for example, may be implemented via electrical touch keys. The dealer control sensors may be used by the dealer to indicate that desired control functions should take place or further proceed. For example, different sensors may be used to implement a player's decision to: split his two similar cards and play them as two separate or split hands; double down; stand on the cards already dealt or assigned to that player; etc. Other sensors may be used to:

- command shuffling and dealing of a new hands to the participants;
- collect a player's cards;
- show a player's cards;
- verify VCARD data (e.g., verify that a VCARD is displaying the correct cards to the player without revealing the cards in the player's hand);
- deal new cards to selected players; authenticate a player's VCARD;
- activate a VCARD;
- replace a player's VCARD with an alternate VCARD;
- call security;
- request cocktail service;
- recall previous game play data;
- control display of multimedia content;
- enable/disable VCARDS;
- etc.

It will be appreciated that other functions may be attributed to other keys or input sensors of various types. For example, in one implementation, at least a portion of the Table Control Console touch keys can be assigned to implement additional functions, such as in changeable soft key assignments during the programming or setup of the system.

According to specific embodiments, the betting chip detection component 260 may be adapted to automatically detect the presence and/or monetary amount of betting chips which have been placed within a player's betting zone. In one implementation, each betting chip detection component 260 includes one or more betting chip sensors which are immediately below or otherwise adjacent to a respective player betting zone. The betting chip sensors may be selected from several different types of sensors.

One suitable type of sensor is a weigh cell which senses the presence of a betting chip thereon so that the master table controller knows at the start of a hand, that a player is participating in the next hand being played. A variety of weigh cells can be used. Another suitable type of sensor includes optical sensors. Such optical sensors can be photosensitive detectors which use changes in the sensed level of light striking the detectors. For example, in one implementation, the betting sensor may use ambient light which beams from area lighting of the casino or other room in which it is placed. When a typical betting chip is placed in a player's betting zone (e.g., 102), the amount of light striking the detector located beneath the zone is measurably diminished by the opaque betting chip. The detector conveys a suitable electrical signal which indicates that a betting chip has been placed within the betting zone 102. A variety of other alternative detectors can also be used. A further type of preferred betting chip sensor is one which can detect coding included on or in the betting chips to ascertain the value of the betting chip or chips being placed by the players into the player betting zones. A preferred form of this type of sensor or detector is used to detect an integrated circuit based radio frequency identification unit which is included in or on the betting chips. Such sensors are sometimes referred to as radio frequency identification detection or read-write stations.

It will be apparent to those skilled in the art that other memory types, including various computer readable media, may be used for storing and executing program instructions pertaining to the operation of the present invention. Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files including higher level code that may be executed by the computer using an interpreter.

Additional details about other intelligent gaming table architectures, features and/or components are described, for example, in U.S. patent application Ser. No. 10/040,239, entitled, "GAME DEVELOPMENT ARCHITECTURE THAT DECOUPLES THE GAME LOGIC FROM THE GRAPHICS LOGIC," published on Apr. 24, 2003 as U.S. Patent Publication No. 20030078103, U.S. patent application Ser. No. 11/425,998, entitled "TABLE GAME BONUSING SYSTEMS AND METHODS," by Nguyen et al. Each of these applications is incorporated herein by reference in its entirety for all purposes.

VCARD Functionality

As stated previously, one aspect of the present invention relates to a method and apparatus for graphically representing and displaying casino game play data (e.g., player cards, dealer cards, etc.) and/or other desired data a mobile or handheld display device (e.g., VCARD) which is adapted for facilitating game play activities conducted at the intelligent gaming table or elsewhere.

Figure 3:
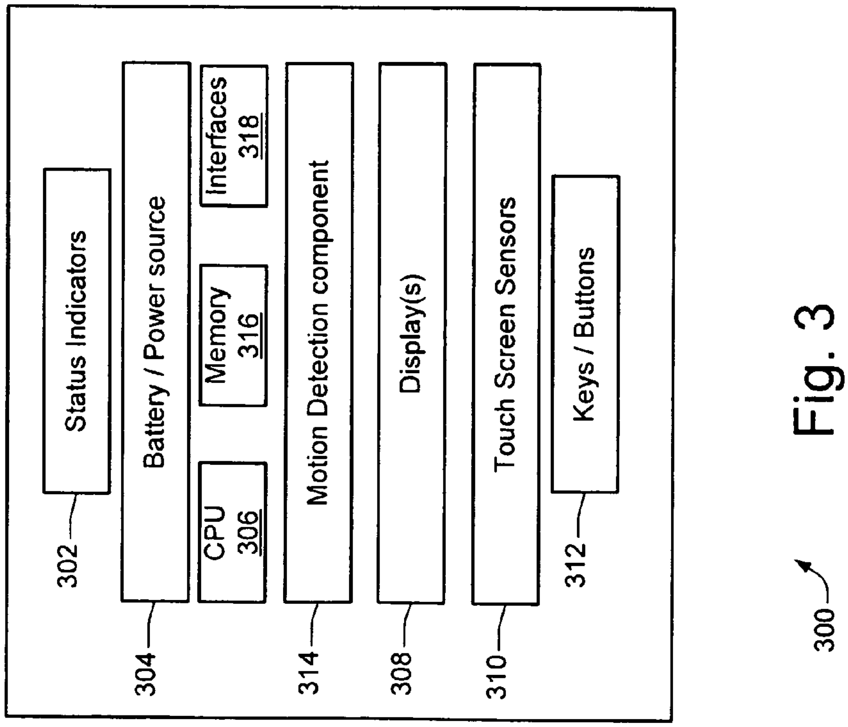
FIG. 3 shows a simplified block diagram of various components which may be used for implementing a VCARD device in accordance with the specific embodiment of the present invention.

FIG. 3 shows a simplified block diagram of various components which may be used for implementing a VCARD device in accordance with the specific embodiment of the present invention.

As illustrated in the example of FIG. 3, VCARD 300 may include a variety of components, modules and/or systems for providing functionality relating to one or more aspects of the present invention. Other VCARD embodiments of the present invention (not shown) may include different or other components than those illustrated in FIG. 3. For example, VCARD 300 may include one or more of the following:

- At least one processor or CPU (306). In at least one implementation, the processor(s) 306 may include at least some functionality similar to processor(s) 210 of FIG. 2.
- Memory 316, which, for example, may include volatile memory (e.g., RAM), non-volatile memory (e.g., disk memory, FLASH memory, EPROMs, etc.), unalterable memory, and/or other types of memory. In at least one implementation, the memory 316 may include at least some functionality similar to memory 216 of FIG. 2.
- Interface(s) 318 which, for example, may include wired interfaces and/or wireless interfaces. In at least one implementation, the interface(s) 318 may include functionality similar to interface(s) 206 of FIG. 2. For example, in at least one implementation, the wireless communication interface(s) may be configured or designed to communicate with components of the intelligent gaming table (such as, for example, VCARD docking regions), remote servers, electronic gaming machines, other wireless devices (e.g., PDAs, other VCARDs, cell phones, player tracking transponders, etc.). Such wireless communication may be implemented using one or more wireless interfaces/protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetics, etc.

At least one power source 304. In at least one implementation, the power source may include at least one mobile power source for allowing the VCARD to operate in a mobile environment. For example, in one implementation, the battery 304 may be implemented using a rechargeable, thin-film type battery. Further, in embodiments where it is desirable for the VCARD to be flexible, the battery 304 may be designed to be flexible.

One or more display(s) 308. According to various embodiments, such display(s) may be implemented using, for example, LCD display technology, OLED display technology, and/or other types of conventional display technology. In at least one implementation, display(s) 308 may be adapted to be flexible or bendable. Additionally, in at least one embodiment the information displayed on display(s) 308 may utilize e-ink technology (such as that available from E Ink Corporation, Cambridge, Mass., www.eink.com), or other suitable technology for reducing the power consumption of information displayed on the display(s) 308.

One or more user I/O Device(s) such as, for example, touch keys/buttons 312, scroll wheels, cursors, touchscreen sensors 310, etc.

One or more status indicators 302. For example, in one implementation, one or more colored status indicators (such as, for example, LEDs) may be included on the back portion of a VCARD (e.g., the side opposite the display 308), and adapted to provide various information such as, for example: communication status; game play status; bonus status, VCARD health status; VCARD operating mode; battery power status; battery charging status; status of cards being dealt; "ok to pickup VCARD" status; error detection status; team status; out of range status; etc.

At least one motion detection component 314 for detecting motion or movement of the VCARD and/or for detecting motion, movement, gestures and/or other input data from user.

In one embodiment, the motion detection component 314 may be operable to detect gross motion of a participant (e.g., player, dealer, etc.) in a casino table game. Additionally, in at least one embodiment, the motion detection component 314 may further be operable to perform one or more additional functions such as, for example: analyze the detected gross motion or gestures of a participant; interpret the participant's motion or gestures (e.g., in the context of the casino game being played) in order to identify instructions or input from the participant; utilize the interpreted instructions/input to advance the game state; etc. In other embodiments, at least a portion of these additional functions may be implemented at a remote system or device.

For example, during play of a game of blackjack at a conventional gaming table, a player may signal "hit me" to the dealer by the player flicking or moving his cards in a sweeping motion towards himself. In at least one embodiment where the player is performing the "hit me" gesture using a VCARD instead of conventional playing cards, the VCARD may be adapted to automatically detect the player's gesture (e.g., gross motion) by sensing motion or movement (e.g., displacement, velocity, acceleration, etc.) using, for example, one or more motion detection sensors. In one embodiment, the VCARD may also be adapted to analyze the detected motion data in order to interpret the gesture (or other input data) intended by the player. Once interpreted, the VCARD may then transmit the interpreted player input data (e.g., "hit me") to the intelligent gaming table for advancement of the game state. Alternatively, the VCARD may be adapted to transmit information relating to the detected motion data to the intelligent gaming table, and the intelligent gaming table adapted to analyze the detected motion data in order to interpret the gesture (or other input data) intended by the player.

According to different embodiments, other criteria may also be used when analyzing the detected motion data for proper interpretation of the player's gestures and/or other input instructions. For example, the interpretation of the detected motion data may be constrained based on one or more of the following criteria: type of game being played (e.g., craps, blackjack, poker, etc.), location of the player/VCARD; current VCARD operating mode (e.g., table game operating mode, bonus game operating mode, restaurant operating mode, theater operating mode, lounge operating mode, hotel operating mode, parking service operating mode, room service operating mode, news magazine operating mode, etc.); game rules; time; player ID; player preferences; previous motion interpretation/analysis; etc.

In at least one embodiment, the motion detection component 314 may include one or more motion detection sensors such as, for example, MEMS (Micro Electro Mechanical System) accelerometers, that can detect the acceleration and/or other movements of the VCARD as it is moved by a user. The VCARD may be further adapted to transmit motion information (and other related information) to the intelligent gaming table and/or other devices. In one implementation, the motion information may include data such as, for example: a VCARD ID for use in identifying the VCARD which transmitted information; participant ID information for use in identifying the participant holding the VCARD, acceleration data in the X, Y, and/or Z axes, etc. According to one implementation, analog acceleration data output from the accelerometers may be digitized and fed into a multiplexer and transmitted to the intelligent gaming table and/or other device.

According to various embodiments, the intelligent gaming table may include at least one receiver for receiving the detected motion data and/or interpreted player input data. In one embodiment, the receiver may be implemented as a multi-channel multi-frequency receiver adapted to receive signals from a plurality of different VCARDs.

Although not illustrated in FIG. 3, other VCARD embodiments of the present invention may include fewer or additional components, modules and/or systems such as, for example:

Device driver(s) which, for example, may include at least some functionality similar to device driver(s) 242 of FIG. 2.

Authentication/validation components which, for example, may be used for authenticating and/or validating local hardware and/or software components and/or hardware/software components residing at a remote device. In at least one implementation, the authentication/validation component(s) may include functionality similar to authentication/validation component(s) 244 of FIG. 2.

Geolocation module which, for example, may be configured or designed to acquire geolocation information from remote sources and use the acquired geolocation information to determine information relating to a relative and/or absolute position of the VCARD. For example, in one implementation, the geolocation module may be adapted to receive GPS signal information for use in determining the position or location of the VCARD. In another implementation, the geolocation module may be adapted to receive multiple wireless signals from multiple remote devices (e.g., gaming machines, servers, wireless access points, etc.) and use the signal information to compute position/location information relating to the position or location of the VCARD.

User Identification module. In one implementation, the User Identification module may be adapted to determine the identity of the current user or owner of the VCARD. For example, in one embodiment, the current user may be required to perform a log in process at the VCARD in order to access one or more features. Alternatively, the VCARD may be adapted to automatically determine the identity of the current user based upon one or more external signals such as, for example, an RFID tag or badge worn by the current user which provides a wireless signal to the VCARD for determining the identity of the current user. In at least one implementation, various security features may be incorporated into the VCARD to prevent unauthorized users from accessing confidential or sensitive information.

Information filtering module(s) which, for example, may be adapted to automatically and dynamically generate, using one or more filter parameters, filtered information to be displayed on the VCARD display(s). In one implementation, such filter parameters may be customizable by the player or VCARD user.

Speakers or other audio output components.

Media presentation modules such as, for example, components for displaying audio/visual media.

Etc.

In at least one embodiment, the VCARD may be operable to automatically select an appropriate mode of operation based on various parameters and/or upon detection of specific events or conditions such as, for example: the VCARD's current location; identity of current user; user input; system override (e.g., emergency condition detected); proximity to other VCARDs belonging to same group or association; proximity to specific objects, regions, zones, etc. Additionally, the VCARD may be operable to automatically update or switch its current operating mode to the selected mode of operation. The VCARD may also be adapted to automatically modify accessibility of user-accessible features and/or information in response to the updating of its current mode of operation.

For example, in response to detecting that the current location of the VCARD is within a predetermined proximity to a restaurant or dining facility (e.g., food court, buffet, etc.), the VCARD may automatically switch its current operating mode to a restaurant operating mode for enabling the VCARD to implement operations associated with restaurant related activities such as, for example: displaying menu items and prices, displaying electronic coupons, providing food or beverage reviews/recommendations, etc.

In response to detecting that the current location of the VCARD is within a predetermined proximity to a theater or entertainment venue, the VCARD may automatically switch its current operating mode to a restaurant operating mode for enabling the VCARD to implement operations associated with theater or entertainment venue related activities such as, for example: facilitating purchase of tickets, displaying events/showtimes, displaying program information, displaying event calendar information, displaying coming attractions, displaying previews, etc.

In response to detecting that the current location of the VCARD is within a predetermined proximity to a lounge, the VCARD may automatically switch its current operating mode to a lounge operating mode for enabling the VCARD to implement operations associated with lounge related activities such as, for example: paging hosts, facilitating wireless ordering, facilitating beverage service, etc.

In response to detecting that the current location of the VCARD is within a predetermined proximity to hotel or guest rooms, the VCARD may automatically switch its current operating mode to a hotel operating mode for enabling the VCARD to implement operations associated with hotel related activities such as, for example: functioning as a room key, facilitating check-in/checkout, facilitating room service orders, etc.

In response to detecting that the current location of the VCARD is within a predetermined proximity to a parking facility the VCARD may automatically switch its current operating mode to a parking operating mode for enabling the VCARD to implement operations associated with parking related activities such as, for example: displaying a location of the user's car, facilitating payment of parking or valet fees, facilitating exchange of e-tickets, vouchers, tips. etc.

In response to detecting that the user of the VCARD desires to access entertainment information such as news, TV shows, music, etc., the VCARD may automatically switch its current operating mode to an entertainment operating mode for enabling the VCARD to implement operations associated with entertainment related activities such as, for example: displaying news stories or magazine articles, presenting streamed audio/visual content, downloading audio and/or video content.

In response to detecting that the current location of the VCARD is within a predetermined proximity to a sports wagering facility the VCARD may automatically switch its current operating mode to a sports wagering operating mode for enabling the VCARD to implement operations associated with sports wagering related activities such as, for example: facilitating placement of bets, displaying desired sporting event information, displaying desired sporting statistical information, displaying historical information, etc.

According to specific embodiments, associations may be made between VCARDs and players (and/or player positions at the intelligent gaming table) such that each VCARD is associated with a different player (and/or player position) at the intelligent gaming table. The intelligent gaming table may adapted to electronically "deal" cards to each of the players at the intelligent gaming table, and to store information relating to each player's hand on that player's corresponding VCARD. In at least one implementation, a player is able to view the cards of his or her hand on via the display of that player's VCARD. As explained in greater detail below, a VCARD may also be adapted to perform other functions such as, for example:

Allowing a player to select cards for discard/holding;

Allowing a player to perform wagering activities (e.g., increasing bets, checking bets, performing side wagering/backbetting activities, etc.);

Retrieving and/or displaying player tracking data;

Retrieving and/or displaying player account data;

Displaying game play assistance information;

Displaying casino layout information;

Displaying promotional information;

Notify a player of messages;

Displaying multimedia information from external sources;
Displaying player's current location;
Etc.

For example, in one implementation, a VCARD may be adapted to communicate with a remote server to access player account data, for example, to know how much funds are available to the player for betting/wagering.

In at least one implementation, the VCARD may also include other functionality such as that provided by PDAs, cell phones, or other mobile computing devices. Further, in at least one implementation, the VCARD may be adapted to automatically and/or dynamically change its functionality depending on various conditions such as, for example: type of game being played; user input; current location or position; detection of local electronic gaming tables/devices; etc.

In at least one embodiment, a VCARD may be implemented using conventional mobile electronic devices (e.g., PDAs, cell phones, etc.) which have been specifically adapted to implement at least a portion of the VCARD functionalities described herein.

Figure 4:
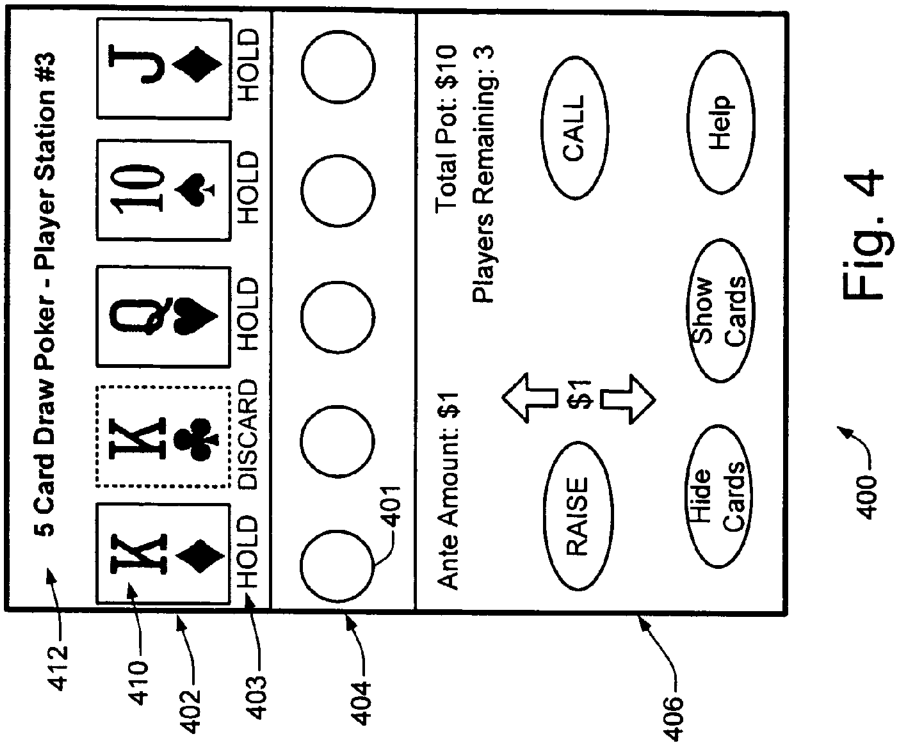
FIG. 4 shows an example of a VCARD display 400 in accordance with a specific embodiment of the present invention.

FIG. 4 shows an example of a VCARD display 400 in accordance with a specific embodiment of the present invention. As illustrated in the example of FIG. 4, VCARD display 400 may include a plurality of separate display regions (e.g., 402, 404, 406) which may be used for displaying different types of information and/or graphical user interfaces (GUIs) to a player or user. In at least some embodiments, the separate display regions may be implemented using separate physical displays. In alternate embodiments, a single physical display may be used to represent multiple virtual display regions.

In at least one implementation, the VCARD display 400 may incorporate the use of touchscreen technology for facilitating input from the player/user. For example, virtual buttons 401 may be used to allow a player to select cards to hold/discard. In alternate embodiments, buttons/keys 401 may be implemented as physical touch keys or buttons.

As illustrated in the example of FIG. 4, display region 402 may be used for displaying graphical and/or text representations of cards (e.g., 410) which have been dealt to the player. In the example of FIG. 4, it is assumed that the player has been dealt five cards while playing a poker game at the intelligent gaming table. It will be appreciated, however, that different numbers and types of cards may be displayed via VCARD display 400 depending upon the different games which are played at the intelligent gaming table. In at least one embodiment, the pattern, graphics and/or other design features of cards could be altered to prevent misreading of cards, for example, due to poor pixels, etc. The displayed information may also include a text display of the player's cards, if desired. Further, at least some of the display parameters (e.g., fonts, style, features, etc.) may be customized by the player/user.

Additional information may also be displayed within display region 402 and/or other display regions of the VCARD. For example, as illustrated in the example of FIG. 4, display region 402 has been adapted to display HOLD/DISCARD card selection information 403 which, for example, may be input by the player via buttons 401. Additionally, as illustrated in FIG. 4, VCARD display 400 may be used to display other types of information/features such as, for example:

Game play information;
Bonus information;
Progressive bonus information;
Tournament play information;
Betting/wagering information;
Paytable information;
Side wagering information;
Game play/wagering rules;
Player tracking information;
Hide cards feature;
Display cards feature;
Game specific features/buttons such as, for example: "Hit me", "Stand", "Double down", "Split pair", "Raise", "Call", etc.
VCARD status information (e.g., battery status, mode of operation, etc.);
Game type information (e.g., "5 Card Draw Poker");
Player ID information (e.g., Player Station #3);
Information relating to the duration of the player's game play activities;
Information relating to criteria to be achieved by the player for obtaining bonuses, comps, status upgrades, etc.;
Etc.

Figure 6:
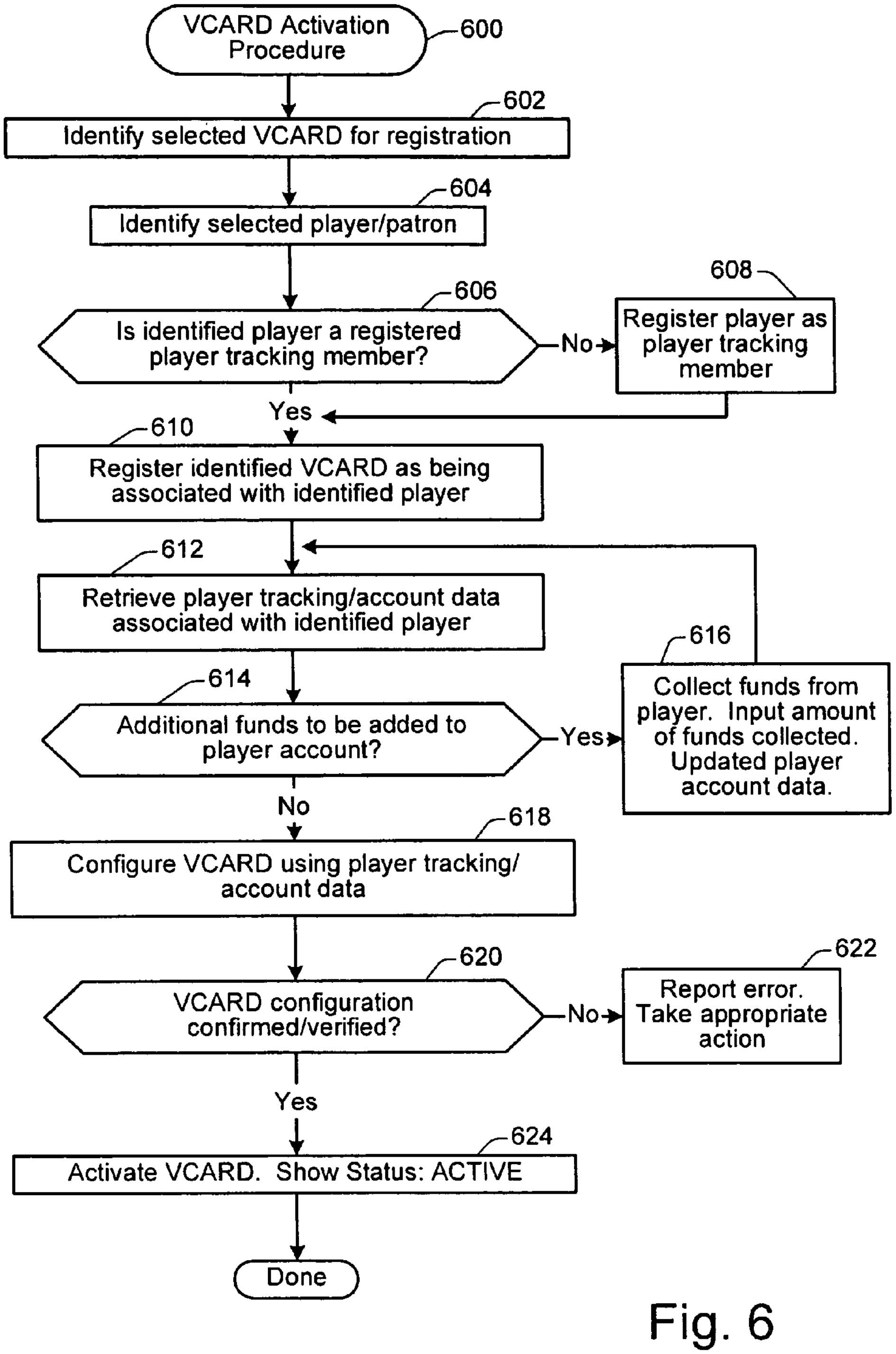
FIG. 6 shows a flow diagram of a VCARD Activation Procedure 600 in accordance with a specific embodiment of the present invention.

FIG. 6 shows a flow diagram of a VCARD Activation Procedure 600 in accordance with a specific embodiment of the present invention. In one implementation, various aspects of the VCARD Activation Procedure 600 may be implemented by an intelligent gaming table (such as, for example, intelligent gaming table 100 of FIG. 1) and/or by other systems/servers of the casino gaming network. For purposes of illustration, the flow diagram of FIG. 6 will be described by way of example. In this example, it is assumed that a new player has approached an intelligent gaming table and desires to obtain a VCARD for participating in the card game being played at the intelligent gaming table. In one embodiment, the dealer may select (602) a VCARD for registration/activation. In one implementation, the VCARD may be registered as being associated with a specific player station at the intelligent gaming table. In some embodiments, the VCARD may also be registered as being associated with a specific player. In other embodiments, the new player may already possess a VCARD which has been registered for use by that player. The player may present his or her VCARD to the dealer for authentication and/or activation of the VCARD for use at the intelligent gaming table.

At 604, the new player may be identified in order to allow the VCARD to be registered to the identified player. In at least one embodiment this step may be omitted such as, for example, in situations where VCARDs are not registered as being associated with a specific players. Alternatively, the player may elect to register as an "anonymous" player. According to different implementations, various features of the VCARD may be automatically enabled/disabled depending on various criteria such as, for example: whether or not the VCARD has been registered as being associated with a specific player, player tracking profile and/or preference information, etc. For example, in one implementation where the VCARD has been registered as being associated with a specific player station at the intelligent gaming table, but has not been registered as being associated with a specific, identified player, wagering functions of the VCARD may be automatically disabled. Wagering activities may be performed by the player using conventional wagering mechanisms such as, for example, by placing physical betting chips within the player's betting area. The player may still use the VCARD to conduct other game play activities such as, for example, viewing his or her hand, selecting cards to hold/discard, signaling instructions such as "hit me" or "stand" to the dealer, etc.

In specific embodiments where it is desirable for the VCARD to be registered for use by a specific player, a determination may be made (606) as to whether the new player is registered as a player tracking member. In one embodiment, if it is determined that the player is not registered as a player tracking member, the player may chose (or be required) to first register (608) as a player tracking member. Thereafter, if desired, a VCARD-Player registration process may be initiated (610) to register the identified VCARD as being associated with the identified player.

In some embodiments, the VCARD may be adapted to display a log in interface to the player for allowing the player to complete or modify the VCARD-Player registration process. The login interface may allow the player to enter a user identification of some type and verify the user identification with a password. Using a menu on the display screen of the login interface, the user may select other display screens relating to the login and registration process. For example, another display screen obtained via a menu on a display screen in the login interface may allow the VCARD or other peripheral device to identify the player using other player ID information such as, for example, a player tracking transponder, biometric identification information, etc.

In specific embodiments, account data and/or other player tracking information associated with the registered player may be accessed (612) and used for automatically and dynamically configuring (618) various features/parameters associated with the VCARD functionality such as, for example, VCARD wagering privileges, maximum funds available for VCARD wagering, wagering limits, side wagering privileges, other player privileges, etc. In one implementation, if desired, the player may also add additional funds to his or her account (614), for example, by presenting additional currency and/or betting chips to the dealer. The dealer may collect the funds from the player, and update the player's account (616) to reflect a credit for the amount of funds collected.

In some embodiments, other information may also be used for automatically and dynamically configuring various features/parameters associated with the VCARD functionality such as, for example:

- Minimum/maximum table betting limits;
- Tournament play capability;
- Progressive bonus capability;
- Limits based on jurisdictional requirements (such as, for example, maximum bet/lost per day, player specified win/loss limits);
- Etc.

At 620, a determination may be made as to whether the VCARD configuration operations have been completed and/or verified. If an error is detected with regard to the VCARD configuration, the error may be reported (622) to one or more appropriate entities (e.g., dealer, security server, etc.), and appropriate action may be taken.

Upon determining that the VCARD configuration was successful, the VCARD may be activated (624). In one implementation, activation of the identified VCARD may be implemented using one or more components of the intelligent gaming table. Additionally, the intelligent gaming table may report the VCARD activation information to a remote server or other entity. In at least one implementation, the VCARD may include one or more status indicators (such as, for example, 302, FIG. 3) for indicating that the VCARD has been properly registered, configured, authenticated, and/or activated.

Figure 5A:
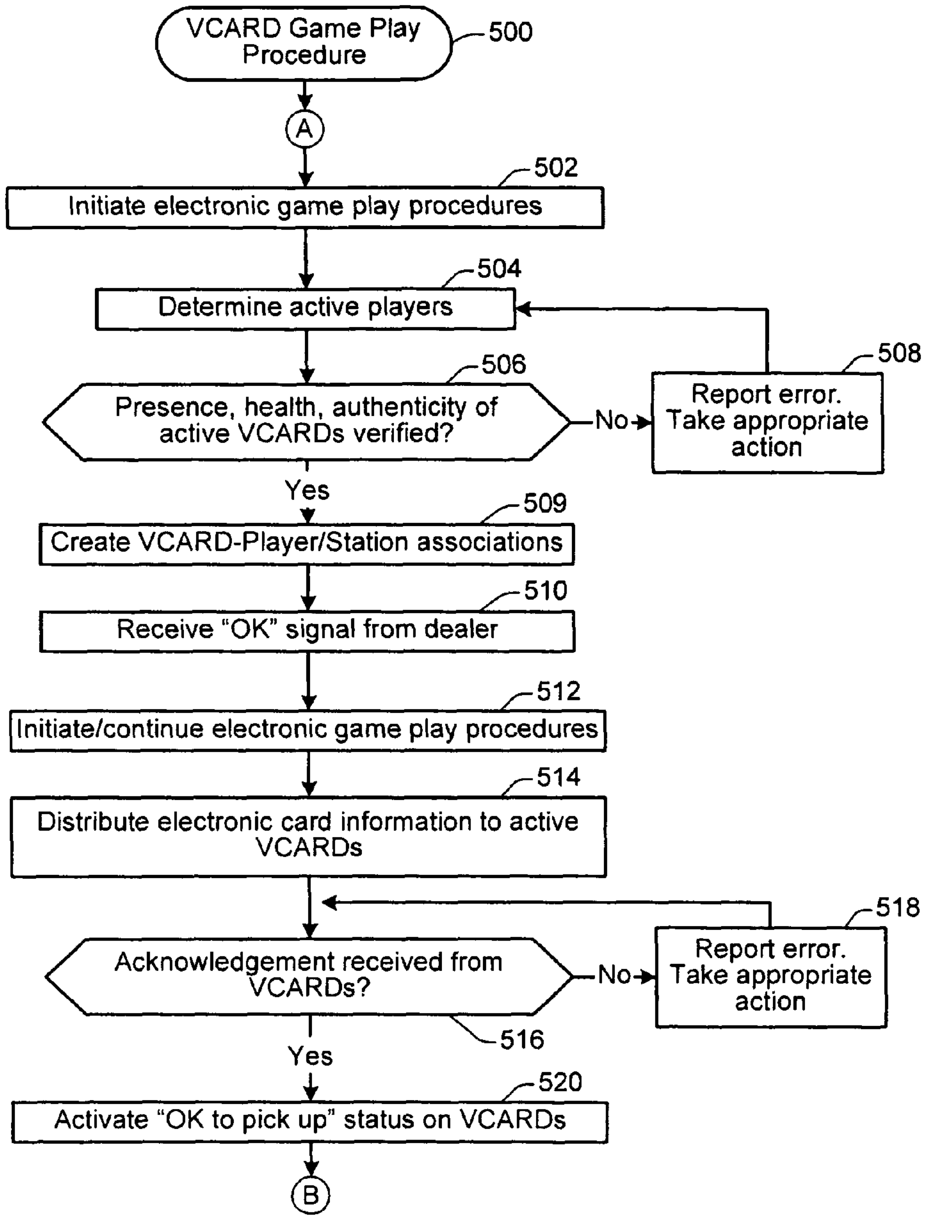
FIGS. 5A and 5B show flow diagrams of a VCARD Game Play Procedure 500 in accordance with a specific embodiment of the present invention.
Figure 5B:
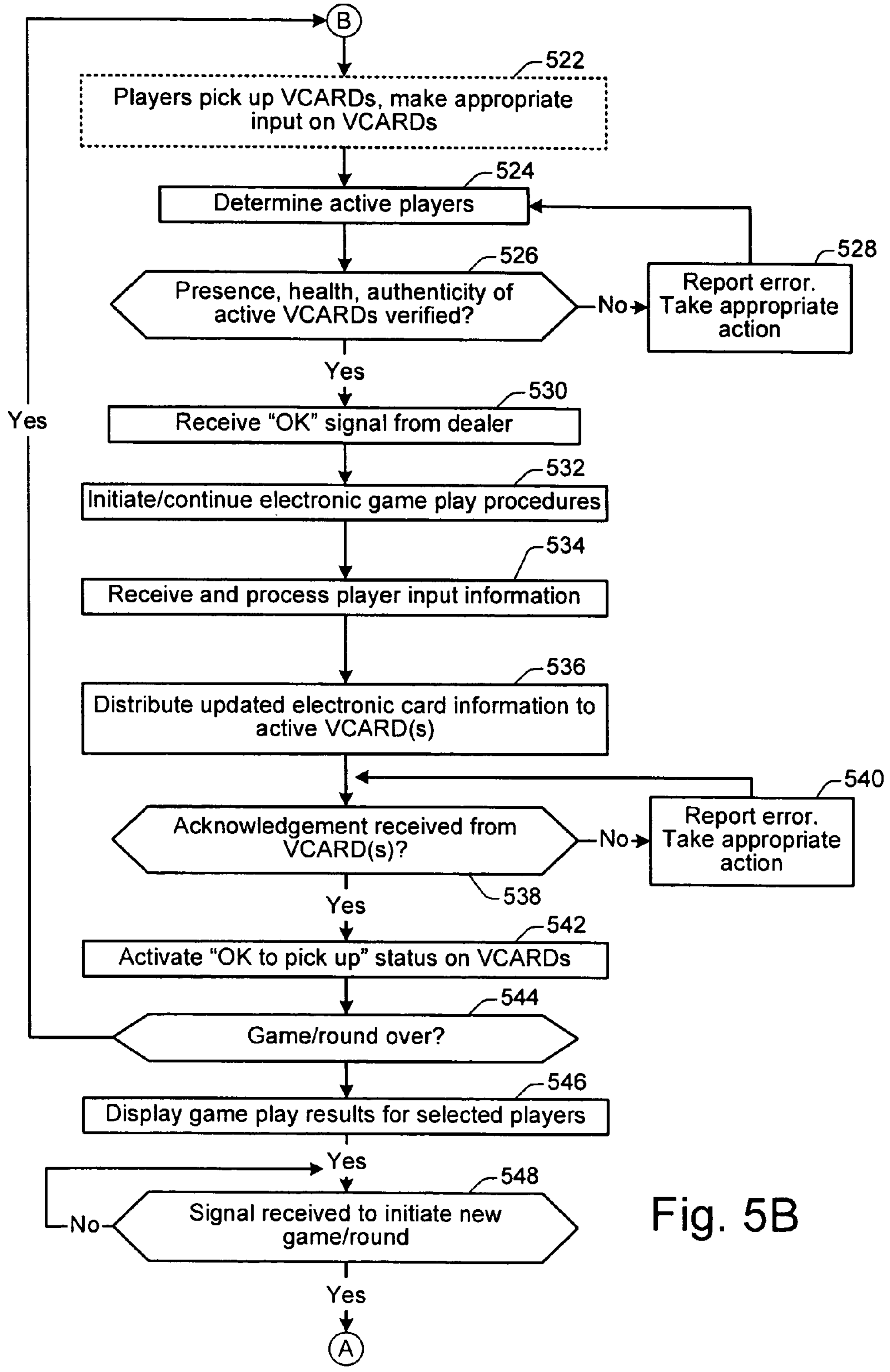

FIGS. 5A and 5B show flow diagrams of a VCARD Game Play Procedure 500 in accordance with a specific embodiment of the present invention. In one implementation, various aspects of the VCARD Game Play Procedure 500 may be implemented by an intelligent gaming table (such as, for example, intelligent gaming table 100 of FIG. 1) and/or by other systems/servers of the casino gaming network.

For purposes of illustration, the flow diagram of FIGS. 5A and 5B will be described by way of example. In this example, it is assumed that an exemplary player (e.g., 105, FIG. 1) occupies a seat or player station (e.g., player station 150) at an intelligent gaming table such as, for example, the intelligent gaming table 100 of FIG. 1. Additionally, in this example it is assumed that the player has possession of a VCARD which has been activated for game play at the intelligent gaming table.

At 502, one or more events may occur for initiating electronic game played procedures at the intelligent gaming table. For example, in one implementation, the dealer may use table control console 120 to initiate procedures for playing a specified card game (e.g., blackjack, 5 card draw poker, etc.) at the intelligent gaming table.

At 504, active or participating players at the intelligent gaming table are identified. According to a specific embodiment, an active player is one who will be participating in the next round (or hand) of play at the intelligent gaming table. Additionally, according to a specific embodiments where hand of play at a table game is characterized as the fundamental element, a round may comprise one or more hands, and a game may comprise one or more rounds.

According to various embodiments, a variety of mechanisms may be used to identify or determine the active players at the intelligent gaming table. Such mechanisms may include one or more of the following (and/or any combination thereof):

- Detection of betting chips placed with a player's associated betting zone.
- Player input (e.g., player may push a button at his or her player station to indicate that the player wishes to participate in the next round of game play).
- Dealer input.
- Detection of the presence of a VCARD in the player's associated VCARD docking region.
- Game history data. In one implementation, active players may be identified based on prior game history data. For example, a player may be identified as a continuing active player of a poker card game if it is determined that the player was an active player at the start of the current round, and that the player has not yet elected to fold or to opt out of the card game.
- Detection of a player using various types of sensors for motion, heat, light, or pattern recognition.
- Etc.

In the example of FIGS. 5A-B, it is assumed that cards will be electronically dealt to each of the active players via each player's associated VCARD. Accordingly, in at least one implementation, before the cards are electronically dealt to the active players, various conditions may be checked, for example, in order to reduce the possibility of errors occurring with respect to the electronic dealing of the cards. For example, as illustrated in the example of FIG. 5A, a determination may be made (506) as to whether a respective VCARD is detected as being present in each active player's associated VCARD docking region. Additionally, in at least some implementations, one or more VCARD related parameters may also be checked such as, for example: VCARD health status, VCARD battery status, VCARD activation status, VCARD authenticity, etc. For example, in one implementation, before the next round of cards is dealt to the active players, the intelligent gaming table may check to make sure that a respective, activated VCARD is present in each active player's associated VCARD docking region. If one or more errors are detected (such as, for example, by one or more required conditions not being satisfied), the detected error(s) may be reported (508) to one or more appropriate entities (e.g., dealer, security system, etc.), and appropriate action may be taken to resolve the error(s).

As shown at 509, one or more VCARD-Player associations and/or VCARD-Player Station associations may be created. As mentioned previously, in one implementation, the VCARD may be associated with a specific player station at the intelligent gaming table. In some embodiments, the VCARD may also be associated with a specific player.

In the specific embodiment of FIG. 5A, unique VCARD-Player Station associations may be created at or before the beginning of each new round so that each VCARD is configured to be operable for sending and/or receiving game play data associated with a unique player station at the intelligent gaming table. Thus, for example, once the round has begun and the VCARD-Player Station associations established, a VCARD which has been associated with Player Station #3 will only be able to receive and display electronic card data which is associated with Player Station #3. During that round of game play, the VCARD associated with Player Station #3 will not be able to receive nor display electronic card data associated other Player Stations at the intelligent gaming table.

Of course one or more conditions may occur which justify exceptions to this feature. For example, if a player's VCARD fails during game play, after the round has started, the dealer may authorize a replacement VCARD to be issued to the player, and may further override or modify the existing VCARD-Player Station associations to allow the replacement VCARD to be properly configured. In another example, a player may be required to move to a different player station at the intelligent gaming table after the round has started (such as, for example, in the case of a device failure at the player's current player station). In such situations, the dealer may override or modify the existing VCARD-Player Station associations to allow the player's VCARD to be properly configured and associated with the new player station occupied by that player.

In at least one implementation, the intelligent gaming table may be adapted to display a confirmation message or other signal to the dealer that all required conditions have been met for initiating the next hand or round of game play. In response, the dealer may perform at least one action (e.g., by depressing an appropriate button or key at the table control console 120) to initiate or continue (512) electronic game play procedures at the intelligent gaming table.

According to various embodiments, at least some of the electronic game play procedures may include electronically dealing and/or distributing card information to each of the active VCARDs at the intelligent gaming table. For example, at the beginning of a new round of blackjack, two cards may be electronically dealt to each active player at the intelligent gaming table. In one implementation, the electronic card information relating to a given player (or player station) may be transmitted from the intelligent gaming table (or a component thereof) to the VCARD associated with that player/player station. The electronic card information may be stored in the VCARD memory, and displayed to the player via the VCARD display.

In at least one embodiment, at least one hand shaking protocol may be utilized for communications between the intelligent gaming table and VCARDs, for example, to ensure that each VCARD has received valid data, and to ensure that each VCARD has received the entirety of the electronic card data (and/or other game play data) that was intended to be received by that particular VCARD. Accordingly, as shown, for example, at 516, a determination may be made as to whether each active VCARD at the intelligent gaming table has properly acknowledged receipt of its corresponding electronic card information (and/or other game play information). If one or more errors are detected, the detected error(s) may be reported (518) to one or more appropriate entities (e.g., dealer, security system, etc.), and appropriate action may be taken to resolve the error(s).

Assuming that each active VCARD at the intelligent gaming table has properly acknowledged receipt of its corresponding electronic card information (and/or other game play information), a status indicator at each of the VCARDs may be automatically activated (520) to indicate to the players that it is now okay to remove their respective VCARDs from the VCARD docking regions, and view the cards which were dealt to them.

As shown at 522, it is assumed that each active player picks up his or her respective VCARD, views his/her hand of cards, and provides specific game play input or instructions. According to various embodiments, a player's game play instructions (and/or other input) may be entered via one or more mechanisms such as; for example: via the player's VCARD; via one or more input devices at the intelligent gaming table which are accessible to the player (such as, for example, player display 112 and/or other input keys/sensors 111); via verbal instructions to the dealer; and/or via other conventional mechanisms. Such game play instructions may include, for example: instructions for identifying at which cards of the player's hand are to be held and/or discarded; wagering instructions; side wagering instructions; game specific instructions such as, for example, "hit me", "I stand", "I call", etc.

According to a specific embodiment, after a player has input his/her game play instructions, the player may then place his/her VCARD back into the player's associated VCARD docking region. Thereafter, as explained in greater detail below, the player's game play instructions may be interpreted and executed, and additional game play operations may be implemented in accordance with each player's game play instructions. Examples of some game play operations may include: electronically "collecting" designated cards from a player's hand, electronically dealing additional cards to a player, providing updated game wager information to a player, etc. In at least one embodiment, at least some of the game play operations may be implemented via a player's VCARD.

In at least one implementation, before implementing at least some of the additional game play operations, it may be desirable to re-determine or identify (524) the current active or participating players at the intelligent gaming table. In one embodiment, such a determination may automatically be performed using various information such as, for example, game history data, player game play instructions, etc. For example, in a game of blackjack, the intelligent gaming table may be adapted to automatically and dynamically track the current game play status of each active player/player station (such as, for example: Player A @ Station #1="bust"; Player B @ Station #2="stand"; Player C @ Station #3=blackjack; Player D @ Station #4="hit me"; dealer station=13) in order to identify, for example, active players who will be receiving additional cards during subsequent game play operations.

At 526, a determination may be made as to whether a respective VCARD is detected as being present in each identified active player's associated VCARD docking region. Alternatively, in at least one embodiment, a determination may be made as to whether a selected VCARD is detected as being within a predetermined distance from its associated VCARD docking region. Such an implementation may used, for example, to allow a player to be dealt additional cards (such as, for example, when the player request the dealer to "hit me" during a game of blackjack) via the player's VCARD without the player having to physically place his or her VCARD within the VCARD docking region each time a new card is to be dealt to the player. In at least one implementation, each VCARD may have a unique ID associated therewith in order to allow the intelligent gaming table to identify and conduct appropriate game play activities with one or more specified VCARDs. Additionally, in at least one implementation, additional security mechanisms may be utilized to maintain secure channels of communication between the intelligent gaming table and selected VCARDs.

Additionally, in at least some implementations, one or more VCARD related parameters may also be checked such as, for example: VCARD health status, VCARD battery status, VCARD activation status, VCARD authenticity, etc. For example, in one implementation, before the next round of cards is dealt to the active players, the intelligent gaming table may check to make sure that a respective, activated VCARD is within a predetermined distance from each active player's associated VCARD docking region. If one or more errors are detected (such as, for example, by one or more required conditions not being satisfied), the detected error(s) may be reported (528) to one or more appropriate entities (e.g., dealer, security system, etc.), and appropriate action may be taken to resolve the error(s).

In at least one implementation, the intelligent gaming table may be adapted to display a confirmation message or other signal to the dealer that all required conditions have been met for initiating subsequent game play operations for the current game being played. In response, the dealer may perform at least one action (e.g., by depressing an appropriate button or key at the table control console 120) to initiate or continue (532) electronic game play operations at the intelligent gaming table.

At 534, the player input information (e.g., player game play instructions) may be accessed (e.g., retrieved from the VCARDs) and processed. Additional game play operations may then be implemented based on each player's game play instructions as well as other parameters such as, for example, game history information, game rules, wagering constraints, etc. For example, in the blackjack example described above, the intelligent gaming table may respond by performing one or more of the following actions:

Player A @ Station #1="bust": The cards which have been electronically dealt to Player A @ Station #1 are electronically collected. Status of Player A @ Station #1 is updated to "Inactive Player". Additionally, in at least one implementation, the status of the VCARD associated with Player A @ Station #1 may be updated as being inactive for the remainder of the current game (or hand of blackjack). The VCARD display (i.e., of the VCARD associated with Player A @ Station #1) may also be configured to temporarily disable display of any card information until the current game/hand of blackjack has ended.

Player B @ Station #2="stand": Status of Player B @ Station #2 is updated to "Active Player—Stand". A flag or other status indicator may be set to indicated that no further cards are to be dealt to Player B @ Station #2 during the current game/hand of blackjack. Additionally, the VCARD associated with Player B @ Station #2 may be configured to prevent the VCARD from modifying its current card data until the current game/hand of blackjack has ended.

Player C @ Station #3=blackjack: Appropriate payout (and/or other rewards, such as bonus rewards) is distributed to Player C. In one implementation, the intelligent gaming table may notify the dealer (e.g., via Display Area A 110) to deliver the appropriate payout to Player C (e.g., by way of betting chips). Alternatively, the appropriate payout (e.g., currency and/or other credits/awards) may be electronically distributed to Player C. For example, in one implementation, wagering credits or other forms of electronic currency may be electronically distributed to Player C's VCARD. Alternatively, wagering credits or other forms of electronic currency may be electronically distributed to Player C's player tracking account, and a signal may be sent to Player C's VCARD to cause the VCARD to retrieve updated account information for Player C from a remote player tracking or accounting server. The cards which have been electronically dealt to Player C @ Station #3 are electronically collected. Status of Player C @ Station #3 is updated to "Inactive Player". Additionally, in at least one implementation, the status of the VCARD associated with Player C @ Station #3 may be updated as being inactive for the remainder of the current game/hand of blackjack. The VCARD display (i.e., of the VCARD associated with Player C @ Station #3) may also be configured to temporarily disable display of any card information until the current game/hand of blackjack has ended.

Player D @ Station #4="hit me": Status of Player D® Station #4 is updated to "Active Player—Deal 1 Card". A flag or other status indicator may be set to indicate that an additional card is to be dealt to Player D @ Station #4 during the current game/hand of blackjack.

At 536, updated electronic card information may be distributed to selected active VCARDs. For example, discarded cards from a player's hand may be electronically "collected" from the player's VCARD. In one implementation, this may be accomplished by the intelligent gaming table providing instructions to the identified VCARD to delete specific cards from the player's hand. Additionally, the updated electronic card information may also include instructions for one or more additional card(s) to a player's hand which have been electronically dealt to that player.

At 538, a determination may be made as to whether each active VCARD at the intelligent gaming table has properly acknowledged receipt of its corresponding electronic card information (and/or other game play information). If one or more errors are detected, the detected error(s) may be reported (540) to one or more appropriate entities (e.g., dealer, security system, etc.), and appropriate action may be taken to resolve the error(s).

Assuming that each active VCARD at the intelligent gaming table has properly acknowledged receipt of its corresponding electronic card information (and/or other game play information), a status indicator at each of the VCARDs may be automatically activated (542) to indicate to the players that it is now ok to remove their respective VCARDs from the VCARD docking region and continue game play.

At 544, a determination may be made as to whether the current game, hand or round has ended. In most cases, the end of a card game, round and/or hand may be determined based on the defined game rules. For example, a game of blackjack may be determined to have ended after all active players' hands and the dealer's hand have finished being played out. A game of poker may be determined to have ended after all active players have revealed their cards, and at least one winner is determined.

If it is determined that the current game is not over, game play for the current game may continue, for example, from reference point B of FIG. 5B. If it is determined that the current game is over, game play results for selected players (e.g., current active players) may be displayed (546), for example, via Display Area A 110 of gaming table 101. In at least one implementation, the dealer may verify that the cards displayed on a winning player's VCARD match that player's corresponding cards which are displayed via Display Area A 110. Additionally, in at least one implementation, the winnings or payouts to selected players may be displayed and/or verified by the dealer. Such security mechanisms may help to prevent cheating by players who attempt to use tampered VCARDs, for example.

When it is determined that conditions are appropriate for initiating a new game or round, a signal may be generated (548) (e.g., by the dealer depressing and appropriate key or button on the Table Control Console 120) to initiate the start of a new game or round at the intelligent gaming table. As shown in the example of FIGS. 5A-B, flow may then continue from reference point A of FIG. 5A.

Gaming System

Figure 7:
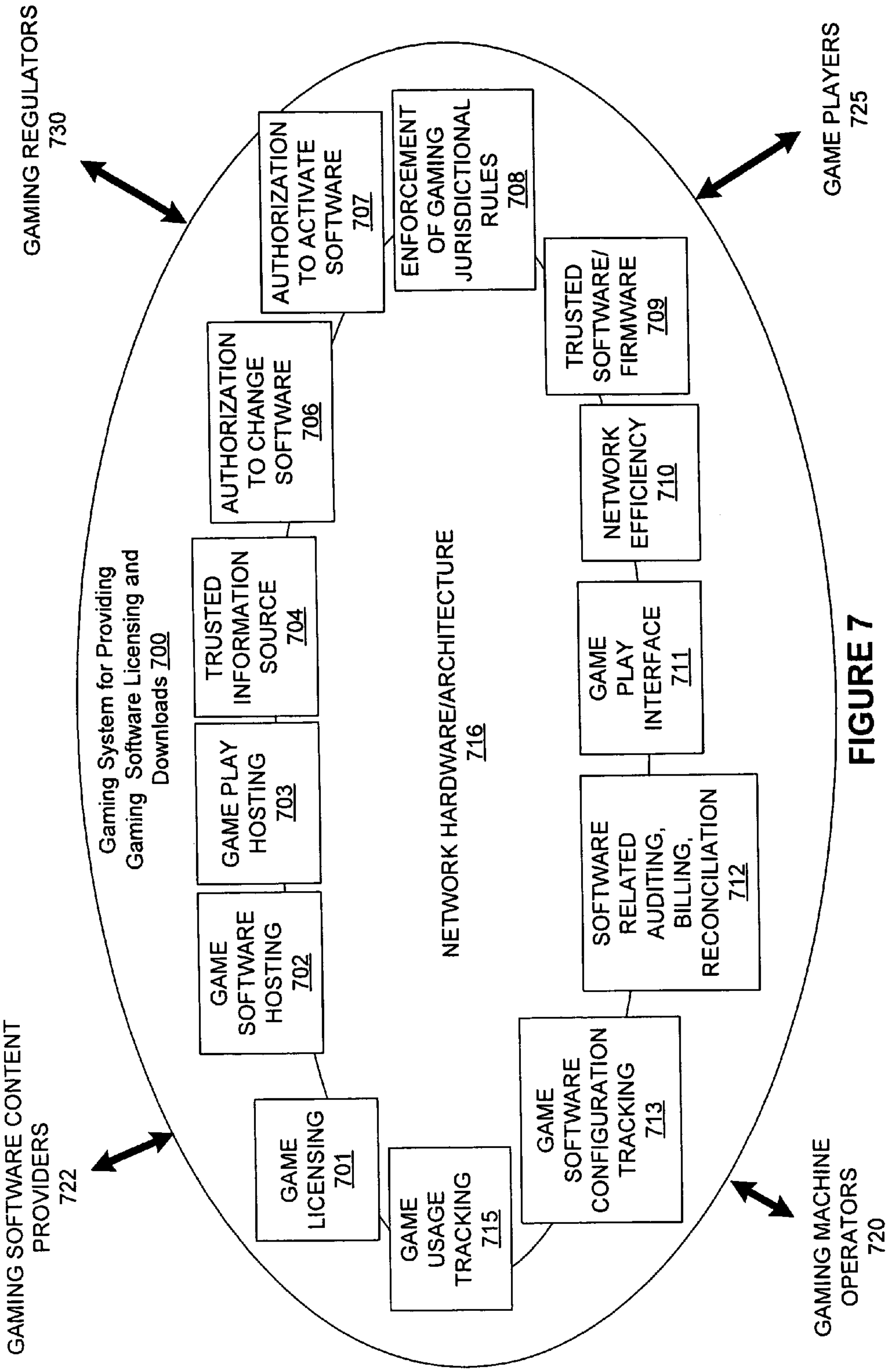
FIG. 7 shows a block diagram illustrating components of a gaming system 700 which may be used for implementing various aspects of the present invention.

FIG. 7 shows a block diagram illustrating components of a gaming system 700 which may be used for implementing various aspects of the present invention. In FIG. 7, the components of a gaming system 700 for providing game software licensing and downloads are described functionally. The described functions may be instantiated in hardware, firmware and/or software and executed on a suitable device. In the system 700, there may be many instances of the same function, such as multiple game play interfaces 711. Nevertheless, in FIG. 7, only one instance of each function is shown. The functions of the components may be combined. For example, a single device may comprise the game play interface 711 and include trusted memory devices or sources 709.

The gaming system 700 may receive inputs from different groups/entities and output various services and or information to these groups/entities. For example, game players 725 primarily input cash or indicia of credit into the system, make game selections that trigger software downloads, and receive entertainment in exchange for their inputs. Game software content providers provide game software for the system and may receive compensation for the content they provide based on licensing agreements with the casino operators. Casino operators select game software for distribution, distribute the game software on the gaming devices in the system 700, receive revenue for the use of their software and compensate the casino operators. The gaming regulators 730 may provide rules and regulations that must be applied to the gaming system and may receive reports and other information confirming that rules are being obeyed.

In the following paragraphs, details of each component and some of the interactions between the components are described with respect to FIG. 7. The game software license host 701 may be a server connected to a number of remote gaming devices that provides licensing services to the remote gaming devices. For example, in other embodiments, the license host 701 may 1) receive token requests for tokens used to activate software executed on the remote gaming devices, 2) send tokens to the remote gaming devices, 3) track token usage and 4) grant and/or renew software licenses for software executed on the remote gaming devices. The token usage may be used in utility based licensing schemes, such as a pay-per-use scheme.

In another embodiment, a game usage-tracking host 715 may track the usage of game software on a plurality of devices in communication with the host. The game usage-tracking host 715 may be in communication with a plurality of game play hosts and intelligent gaming tables. From the game play hosts and intelligent gaming tables, the game usage tracking host 715 may receive updates of an amount that each game available for play on the devices has been played and on amount that has been wagered per game. This information may be stored in a database and used for billing according to methods described in a utility based licensing agreement.

The game software host 702 may provide game software downloads, such as downloads of game software, game play rules, game firmware, etc. to various devious in the game system 700. For example, when the software for initiating a desired card game is not available at the intelligent gaming table, the game software host 702 may download software and/or other information for enabling the intelligent gaming table to initiate the desired card game. Further, the game software host 702 may download new game content to a plurality of intelligent gaming tables via a request from an intelligent gaming table operator (e.g., dealer).

In one embodiment, the game software host 702 may also be a game software configuration-tracking host 713. The function of the game software configuration-tracking host is to keep records of software configurations and/or hardware configurations for a plurality of devices in communication with the host (e.g., game play rules, wagering limits, denominations, paytables, max/min bets, etc.). Details of a game software host and a game software configuration host that may be used with the present invention are described in co-pending U.S. Pat. No. 6,645,077, by Rowe, entitled, "Gaming Terminal Data Repository and Information System," filed Dec. 21, 2000, which is incorporated herein in its entirety and for all purposes.

A game play host device 703 may be a host server connected to a plurality of remote clients that generates various game data (e.g., games of skill, games of chance, etc.) that are displayed on a plurality of remote game play interfaces 711. For example, the game play host device 703 may be a server that provides central determination for a bingo game play played on a plurality of connected game play interfaces 711. As another example, the game play host device 703 may generate games of chance, such as slot games or video card games, for display on a remote client. A game player using the remote client may be able to select from a number of games that are provided on the client by the host device 703. The game play host device 703 may receive game software management services, such as receiving downloads of new game software, from the game software host 702 and may receive game software licensing services, such as the granting or renewing of software licenses for software executed on the device 703, from the game license host 701.

In particular embodiments, the game play interfaces or other gaming devices in the gaming system 700 may be portable devices, such as electronic tokens, cell phones, smart cards, tablet PC's, PDA's, VCARDs, etc. The portable devices may support wireless communications and thus, may be referred to as wireless mobile devices or wireless handheld devices. The network hardware architecture 716 may be enabled to support communications between wireless mobile devices and other gaming devices in gaming system. In one embodiment, the wireless mobile devices may be used to play games of chance and/or games of skill.

The gaming system 700 may use a number of trusted information sources. Trusted information sources 704 may be devices, such as servers, that provide information used to authenticate/activate other pieces of information. CRC values used to authenticate software, license tokens used to allow the use of software or product activation codes used to activate to software are examples of trusted information that might be provided from a trusted information source 704. Trusted information sources may be a memory device, such as an EPROM, that includes trusted information used to authenticate other information. For example, a game play interface 711 may store a private encryption key in a trusted memory device that is used in a private key-public key encryption scheme to authenticate information from another gaming device.

When a trusted information source 704 is in communication with a remote device via a network, the remote device will employ a verification scheme to verify the identity of the trusted information source. For example, the trusted information source and the remote device may exchange information using public and private encryption keys to verify each other's identities. In another embodiment of the present invention, the remote device and the trusted information source may engage in methods using zero knowledge proofs to authenticate each of their respective identities. Details of zero knowledge proofs that may be used with the present invention are described in US publication no. 2003/0203756, by Jackson, filed on Apr. 25, 2002 and entitled, "Authentication in a Secure Computerized Gaming System, which is incorporated herein in its entirety and for all purposes.

Gaming devices storing trusted information might utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

The gaming system 700 of the present invention may include devices 706 that provide authorization to download software from a first device to a second device and devices 707 that provide activation codes or information that allow downloaded software to be activated. The devices, 706 and 707, may be remote servers and may also be trusted information sources. One example of a method of providing product activation codes that may be used with the present invention is describes in previously incorporated U.S. Pat. No. 6,264,561.

A device 706 that monitors a plurality of gaming devices to determine adherence of the devices to gaming jurisdictional rules 708 may be included in the system 700. In one embodiment, a gaming jurisdictional rule server may scan software and the configurations of the software on a number of gaming devices in communication with the gaming rule server to determine whether the software on the gaming devices is valid for use in the gaming jurisdiction where the gaming device is located. For example, the gaming rule server may request a digital signature, such as CRC's, of particular software components and compare them with an approved digital signature value stored on the gaming jurisdictional rule server.

Further, the gaming jurisdictional rule server may scan the remote gaming device to determine whether the software is configured in a manner that is acceptable to the gaming jurisdiction where the gaming device is located. For example, a maximum bet limit may vary from jurisdiction to jurisdiction and the rule enforcement server may scan a gaming device to determine its current software configuration and its location and then compare the configuration on the gaming device with approved parameters for its location.

A gaming jurisdiction may include rules that describe how game software may be downloaded and licensed. The gaming jurisdictional rule server may scan download transaction records and licensing records on a gaming device to determine whether the download and licensing was carried out in a manner that is acceptable to the gaming jurisdiction in which the gaming device is located. In general, the game jurisdictional rule server may be utilized to confirm compliance to any gaming rules passed by a gaming jurisdiction when the information needed to determine rule compliance is remotely accessible to the server.

Game software, firmware or hardware residing a particular gaming device may also be used to check for compliance with local gaming jurisdictional rules. In one embodiment, when a gaming device is installed in a particular gaming jurisdiction, a software program including jurisdiction rule information may be downloaded to a secure memory location on an intelligent gaming table or the jurisdiction rule information may be downloaded as data and utilized by a program on the intelligent gaming table. The software program and/or jurisdiction rule information may used to check the gaming device software and software configurations for compliance with local gaming jurisdictional rules. In another embodiment, the software program for ensuring compliance and jurisdictional information may be installed in the intelligent gaming table prior to its shipping, such as at the factory where the intelligent gaming table is manufactured.

The gaming devices in game system 700 may utilize trusted software and/or trusted firmware. Trusted firmware/software is trusted in the sense that is used with the assumption that it has not been tampered with. For instance, trusted software/firmware may be used to authenticate other game software or processes executing on a gaming device. As an example, trusted encryption programs and authentication programs may be stored on an EPROM on the intelligent gaming table or encoded into a specialized encryption chip. As another example, trusted game software, i.e., game software approved for use on gaming devices by a local gaming jurisdiction may be required on gaming devices on the intelligent gaming table.

In the present invention, the devices may be connected by a network 716 with different types of hardware using different hardware architectures. Game software can be quite large and frequent downloads can place a significant burden on a network, which may slow information transfer speeds on the network. For game-on-demand services that require frequent downloads of game software in a network, efficient downloading is essential for the service to viable. Thus, in the present inventions, network efficient devices 710 may be used to actively monitor and maintain network efficiency. For instance, software locators may be used to locate nearby locations of game software for peer-to-peer transfers of game software. In another example, network traffic may be monitored and downloads may be actively rerouted to maintain network efficiency.

One or more devices in the present invention may provide game software and game licensing related auditing, billing and reconciliation reports to server 712. For example, a software licensing billing server may generate a bill for a gaming device operator based upon a usage of games over a time period on the gaming devices owned by the operator. In another example, a software auditing server may provide reports on game software downloads to various gaming devices in the gaming system 700 and current configurations of the game software on these gaming devices.

At particular time intervals, the software auditing server 712 may also request software configurations from a number of gaming devices in the gaming system. The server may then reconcile the software configuration on each gaming device. In one embodiment, the software auditing server 712 may store a record of software configurations on each gaming device at particular times and a record of software download transactions that have occurred on the device. By applying each of the recorded game software download transactions since a selected time to the software configuration recorded at the selected time, a software configuration is obtained. The software auditing server may compare the software configuration derived from applying these transactions on a gaming device with a current software configuration obtained from the gaming device. After the comparison, the software-auditing server may generate a reconciliation report that confirms that the download transaction records are consistent with the current software configuration on the device. The report may also identify any inconsistencies. In another embodiment, both the gaming device and the software auditing server may store a record of the download transactions that have occurred on the gaming device and the software auditing server may reconcile these records.

There are many possible interactions between the components described with respect to FIG. 7. Many of the interactions are coupled. For example, methods used for game licensing may affect methods used for game downloading and vice versa. For the purposes of explanation, details of a few possible interactions between the components of the system 700 relating to software licensing and software downloads have been described. The descriptions are selected to illustrate particular interactions in the game system 700. These descriptions are provided for the purposes of explanation only and are not intended to limit the scope of the present invention.

Figure 8:
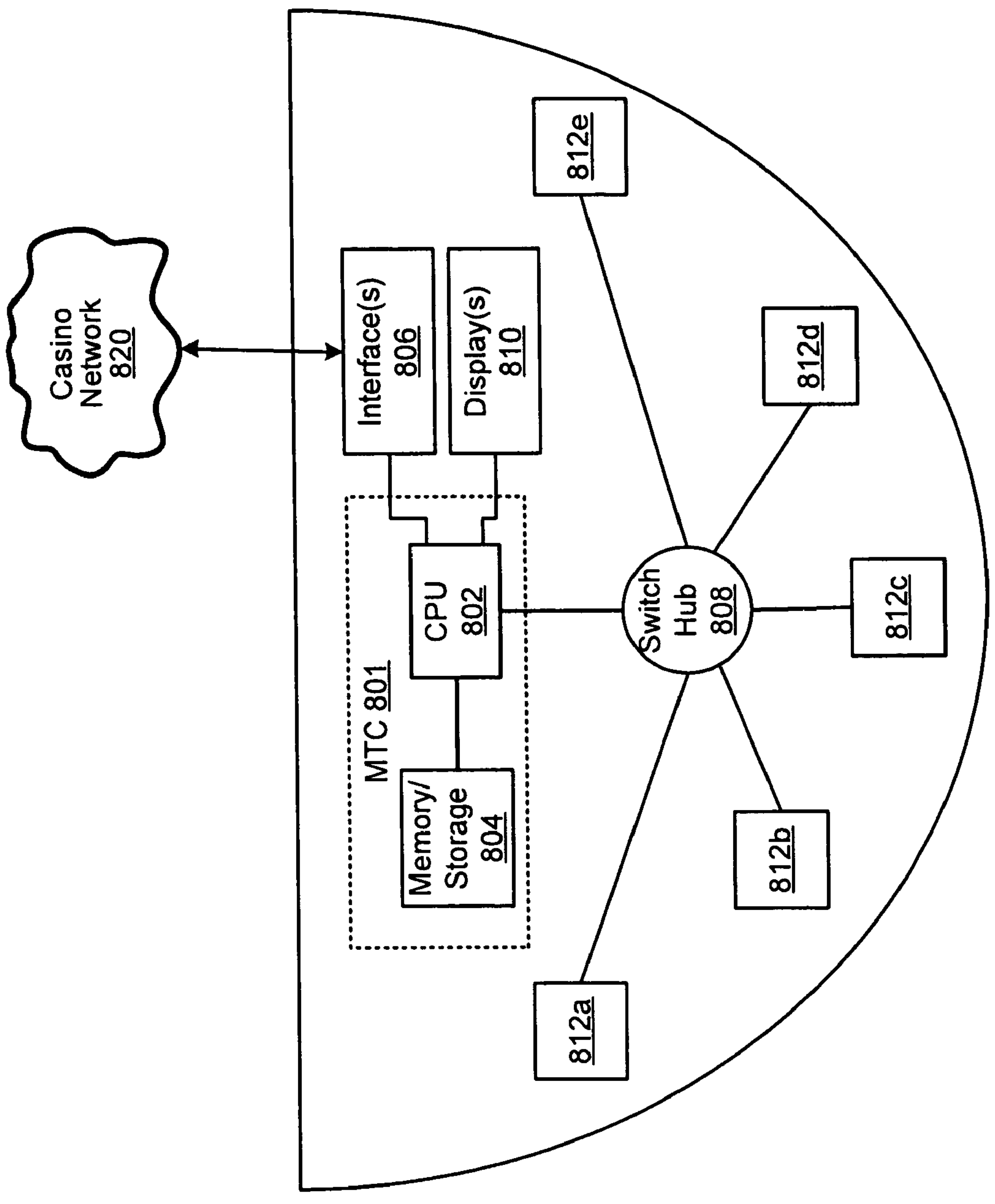
FIG. 8 is a simplified block diagram of an exemplary intelligent gaming table 800 in accordance with a specific embodiment of the present invention.

FIG. 8 is a simplified block diagram of an exemplary intelligent gaming table 800 in accordance with a specific embodiment of the present invention. As illustrated in the embodiment of FIG. 8, intelligent gaming table 800 includes a master table controller (MTC) 801, one or more displays 810, and a plurality of electronic player stations (e.g., 812*a-e*) which, for example, may be connected to the MTC 801 via at least one switch or hub 808. In at least one embodiment, master table controller 801 may include at least one processor or CPU 802, and memory 804. Additionally, as illustrated in the example of FIG. 8, intelligent gaming table 800 may also include one or more interfaces 806 for communicating with other devices and/or systems in the casino network 820.

According to specific embodiments, one or more of the players stations may include a wireless communication system operable to perform wireless data communication with one or more VCARDs. Such a data communication may include, for example, game play data relating to game play activities conducted at the casino gaming table. For example, in one embodiment, the a player station (e.g., 812*c*) may be operable to transmit game play data to a player's VCARD which has been registered or associated with that particular player station. The player station may also be operable to receive, via the VCARD, game play input data provided by the player at the player station 812*c*. Additionally, as illustrated in the example of FIG. 8, player station 812*c* also includes at least one interface (e.g., wired or wireless) for communicating with the MTC 801 (e.g., via switch/hub 808). Although not specifically illustrated in FIG. 8, player station 812*c* may also include a power interface (e.g., wired or wireless) which is operable to distribute power to one or more VCARDs (e.g., during times when the VCARD is docket at the player station, and/or during times when the VCARD is within a predetermined distance from the player station).

According to specific embodiments, MTC 801 may be include functionality for performing and/or facilitating a variety of different operations such as, but not limited to, one or more of the following:

communicate game play data to at least one VCARD;

deal electronic cards (e.g., to VCARDs and/or to gaming table displays);

verify cards which have been dealt to player(s)/dealer;

read player ID info;

keep track of player wagering;

keep track of cards in each player's hand;

tabulate game/bonus outcomes and/or options;

display game play status/results;

log game history data;

detect, authenticate and/or verify wagering chips used for game play wagering;

provide instructions to dealer/player(s);

communicate with other devices/systems in the casino gaming network such as, for example: gaming servers; promotion servers; software update servers; bonusing systems; game download systems; player tracking systems; accounting servers; back betting systems; progressive play systems; tournament play systems; ticket in/ticket out systems; etc.;

control peripheral devices such as, for example: printers, lights, buttons, card readers, casino chip readers, cameras, bill validators, displays, player tracking components, ticket readers, etc;

implement other functionality similar to that of MTC 212 of FIG. 2;

etc.

Additional details relating to various aspects of gaming technology are described in U.S. patent application Ser. No. 11/515,183, by Nguyen et al., entitled "Intelligent Wireless Mobile Device For Use With Casino Gaming Table Systems", filed concurrently herewith, the entirety of which is incorporated herein by reference for all purposes.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

It is claimed:

1. A method comprising:

implementing, at a first handheld device, an operation relating to game play activities of a casino table game within a casino gaming table system, said casino gaming table system comprising (i) the first handheld device communicatively coupled to the casino gaming table system via a communications link, and (ii) a plurality of casino gaming tables, each casino gaming table including a dealer station and a plurality of player stations, each player station comprising a docking region, the casino table game including a plurality of participants including a dealer and a first player, wherein the first handheld device is registered for the exclusive use of the first player, said operation includes:

electronically dealing a first card to the first player via the first handheld device; and displaying, via a first display at the first handheld device, a representation of the first card to the first player, wherein the first handheld device is configured to:

be operable at any authorized one of the plurality of casino gaming tables;

detect a presence of a first docking region at the casino gaming table;

identify the first docking region as being associated with a first player station;

verify whether the first handheld device has been authorized for communicating at the first player station;

establish a pairing mechanism between the first handheld device and the first docking region, wherein said pairing mechanism disables the handheld device from communicating with any other docking region at the casino gaming table during game play; and implement the operation only after receiving enabling instructions from the casino gaming table system.

2. The method of claim 1 further comprising:

transmitting a first portion of card information to the first handheld device, the first portion of card information including information which identifies the first card as a specific playing card which has been dealt to the first player; and displaying a graphical representation of the specific playing card on the first display of the first handheld device.

3. The method of claim 1 further comprising:

transmitting a first portion of card information to the first handheld device, the first portion of card information including information which identifies the first card as a specific playing card which has been dealt to the first player station; and displaying a graphical representation of the specific playing card on the first display of the first handheld device.

4. The method of claim 1 wherein the first player is occupying the first player station at the casino gaming table, the method further comprising:

creating an association between the first handheld device and the first player station.

5. The method of claim 1 wherein the first player is occupying the first player station at the casino gaming table, the method further comprising:

creating an association between the first handheld device and the first player.

6. The method of claim 1 further comprising:

creating a first association between the first handheld device and the first player station; and dynamically configuring the casino gaming table system in response to creating the first association;

wherein the dynamic configuring of the casino gaming table system results in the first handheld device being operable for displaying game play data which relates to game play activities conducted at the first player station.

7. The method of claim 1 further comprising:

creating a first association between the first handheld device and the first player station;

dynamically configuring the casino gaming table system in response to creating the first association;

wherein the dynamic configuring of the casino gaming table system results in the first handheld device being operable to display game play data relating to game play activities associated with the first player station; and wherein the dynamic configuring of the casino gaming table system further results in the first handheld device not being operable to display other player card information relating to cards which have been dealt to other players at the casino gaming table.

8. The method of claim 1 wherein the casino gaming table system includes a second handheld device, and wherein the casino gaming table includes a second player station, the method further comprising:

creating a first association between the first handheld device and the first player station;

creating a second association between the second handheld device and the second player station;

dynamically configuring the casino gaming table system in response to creating the first and second associations;

wherein the dynamic configuring of the casino gaming table system results in the first handheld device being operable for displaying game play data which relates to game play activities associated with the first player station;

wherein the dynamic configuring of the casino gaming table system further results in the second handheld being operable for displaying game play data which relates to game play activities associated with the second player station;

wherein the dynamic configuring of the casino gaming table system further results in the first handheld device not being operable to display second player card information relating to cards which have been dealt to the second player station; and wherein the dynamic configuring of the casino gaming table system further results in the second handheld device not being operable to display first player card information relating to cards which have been dealt to the first player station.

9. The method of claim 1 further comprising:

detecting that a start of a new round of the casino table game has been initiated at the casino gaming table;

creating a first association between the first handheld device and the first player station during play of the new round of the casino table game;

dynamically configuring the casino gaming table system in response to creating the first association;

wherein the dynamic configuring of the casino gaming table system results in the first handheld device being operable to display game play data relating to game play activities associated with the first player station; and wherein the dynamic configuring of the casino gaming table system further results in the first handheld device not being operable, during play of the new round of the casino table game, to display other player card information relating to cards which have been dealt to other players at the casino gaming table.

10. The method of claim 1 further comprising:

identifying the first handheld device as being authorized for conducting game play activities associated with the first player station;

determining whether the first handheld device is within a predetermined distance from a first component of the casino gaming table;

transmitting to the first handheld device game play data relating to game play activities associated with the first player station in response to a determination that the first handheld device is within the predetermined distance from the first component of the casino gaming table.

11. The method of claim 1 further comprising:

determining whether the first handheld device is within a predetermined distance from a first component of the casino gaming table; and preventing transmission of game play data to the first handheld device in response to a determination that the first handheld device is not within the predetermined distance from the first component of the casino gaming table.

12. A method comprising:

implementing an operation for facilitating play of a casino table game at a casino gaming table system, the casino gaming table system including a plurality of casino gaming tables and a first handheld device communicatively coupled to the casino gaming table system via a communications link, each casino gaming table including a dealer station, a plurality of player stations, each player station comprising a docking region, the casino game including a plurality of participants including a dealer and a first player, wherein the first handheld device is registered for the exclusive use of the first player, said operation includes:

detecting a presence of the first handheld device within a predetermined distance of the first docking region;

electronically dealing a first card to the first player via the first handheld device; and wherein the first handheld device is configured to:

be operable at any authorized one of the plurality of casino gaming tables;

detect a presence of the first docking region;

identify the first docking region as being associated with a first player station;

verify whether the first handheld device has been authorized for communicating at the first player station;

establish a pairing mechanism between the first handheld device and the first docking region, wherein said pairing mechanism disables the handheld device from communicating with any other docking region at the casino gaming table during game play; and implement the operation only after receiving enabling instructions from the casino gaming table system.

13. The method of claim 12 further comprising:

detecting a presence of a second handheld device within a predetermined distance of the first docking region;

determining that that the second handheld device has not been authorized for conducting game play operations relating to the first player station;

generating at least one error message in response to a determination that that the second handheld device has not been authorized for conducting game play operations relating to the first player station.

14. The method of claim 12 further comprising:

detecting a presence of a second handheld device within a predetermined distance of the first docking region;

determining that that the second handheld device has not been authorized for conducting game play operations relating to the first player station;

preventing game play data relating to the first player station from being transmitted to the second handheld device in response to a determination that the second handheld device has not been authorized for conducting game play operations relating to the first player station.

15. The method of claim 12 further comprising:

verifying that the first handheld device has been authorized for conducting game play activities relating to the first player station during a current round of the casino table game.

16. The method of claim 12 further comprising:

creating a first association between the first handheld device and the first player station during play of a current round of game play being conducted at the casino gaming table;

dynamically configuring the casino gaming table system in response to creating the first association;

wherein the dynamic configuring of the casino gaming table system results in the first handheld device being operable to display game play data relating to game play activities associated with the first player station; and wherein the dynamic configuring of the casino gaming table system further results in the first handheld device not being operable, during play of the current round of game play, to display other player card information relating to cards which have been dealt to other players at the casino gaming table.

17. The method of claim 12 further comprising:

receiving, via the first handheld device, first game play instructions from the first active player; and implementing additional game play operations at the casino gaming table based on the received first game play instructions.

18. A casino gaming table system for facilitating play of a casino table game, the casino gaming table system comprising:

a plurality of casino gaming tables, each casino gaming table including a dealer station, a plurality of player stations, each player station comprising a docking region, the casino table game including a plurality of participants including a dealer and a first player;

a first handheld device registered for the exclusive use of the first player;

the system being operable to:

implement an operation relating to game play activities of the casino table game;

electronically deal a first card to the a first player at the first player station via the first handheld device; and display, via a first display at the first handheld device, a representation of the first card to the first player, wherein the first handheld device is configured to:

be operable at any authorized one of the plurality of casino gaming tables;

detect a presence of a first docking region at the casino gaming table;

identify the first docking region as being associated with a first player station;

verify whether the first handheld device has been authorized for communicating at the first player station;

establish a pairing mechanism between the first handheld device and the first docking region, wherein said pairing mechanism disables the handheld device from communicating with any other docking region at the casino gaming table during game play; and implement the operation only after receiving enabling instructions from the casino gaming table system.

19. The casino gaming table system of claim 18 wherein the first handheld device includes at least one motion detection sensor for detecting motion or movement of the handheld device.

20. The casino gaming table system of claim 18 being further operable to:

transmit a first portion of card information to the first handheld device, the first portion of card information including information which identifies the first card as a specific playing card which has been dealt to the first player; and display a graphical representation of the specific playing card on the first display of the first handheld device.

21. The casino gaming table system of claim 18 being further operable to:
create a first association between the first handheld device and the first player station; and
dynamically configure the casino gaming table system in response to the creation of the first association;
wherein the dynamic configuration of the casino gaming table system results in the first handheld device being operable for displaying game play data which relates to game play activities conducted at the first player station.

22. The casino gaming table system of claim 18 being further operable to:
create a first association between the first handheld device and the first player station;
dynamically configure the casino gaming table system in response to the creation of the first association;
wherein the dynamic configuration of the casino gaming table system results in the first handheld device being operable to display game play data relating to game play activities associated with the first player station; and
wherein the dynamic configuration of the casino gaming table system further results in the first handheld device not being operable to display other player card information relating to cards which have been dealt to other players at the casino gaming table.

23. The casino gaming table system of claim 18 further comprising:
a second handheld device; and
a second player station at the casino gaming table;
the casino gaming table system being further operable to:
create a first association between the first handheld device and the first player station;
create a second association between the second handheld device and the second player station;
dynamically configure the casino gaming table system in response to the creation of the first and second associations;
wherein the dynamic configuration of the casino gaming table system results in the first handheld device being operable for displaying game play data which relates to game play activities associated with the first player station;
wherein the dynamic configuration of the casino gaming table system further results in the second handheld being operable for displaying game play data which relates to game play activities associated with the second player station;
wherein the dynamic configuration of the casino gaming table system further results in the first handheld device not being operable to display second player card information relating to cards which have been dealt to the second player station; and
wherein the dynamic configuration of the casino gaming table system further results in the second handheld device not being operable to display first player card information relating to cards which have been dealt to the first player station.

24. The casino gaming table system of claim 18 being further operable to:
detect, at the first player station, a first active player of the casino table game being played at the casino gaming table;
detect a presence of the first handheld device within the first docking region;
electronically deal a first card to the first active player via the first handheld device; and
display, via a first display at the first handheld device, a representation of the first card to the first active player.

25. The casino gaming table system of claim 18 being further operable to:
detect a presence of a second handheld device within the first docking region;
determine that that the second handheld device has not been authorized for conducting game play activities relating to the first player station;
prevent game play data relating to the first player station from being transmitted to the second handheld device in response to a determination that the second handheld device has not been authorized for conducting game play activities relating to the first player station.

26. The casino gaming table system of claim 18 being further operable to:
verify that the first handheld device has been authorized for conducting game play activities relating to the first player station during a current round of the casino table game.

27. The casino gaming table system of claim 18 being further operable to:
receive, via the first handheld device, first game play instructions from the first active player; and
implement additional game play operations at the casino gaming table based on the received first game play instructions.

28. The casino gaming table system of claim 18 being further operable to:
identify the first handheld device as being authorized for conducting game play activities associated with the first player station;
determine whether the first handheld device is within a predetermined distance from the first docking region;
transmit to the first handheld device game play data relating to game play activities associated with the first player station in response to a determination that the first handheld device is within the predetermined distance from the first docking region.

29. The casino gaming table system of claim 18 being further operable to:
determine whether the first handheld device is within a predetermined distance from the first docking region; and
prevent transmission of game play data to the first handheld device in response to a determination that the first handheld device is not within the predetermined distance from the first docking region.

* * * * *